(12) United States Patent
Liljedahl et al.

(10) Patent No.: US 11,914,972 B2
(45) Date of Patent: Feb. 27, 2024

(54) ELEMENT ORDERING HANDLING IN A RING BUFFER

(71) Applicant: Arm Limited, Cambridge (GB)

(72) Inventors: Eric Ola Harald Liljedahl, Lund (SE); Samuel Thomas Lee, Cambridge (GB)

(73) Assignee: Arm Limited, Cambridge (GB)

( * ) Notice: Subject to any disclaimer, the term of this patent is extended or adjusted under 35 U.S.C. 154(b) by 97 days.

(21) Appl. No.: 17/756,580

(22) PCT Filed: Nov. 13, 2020

(86) PCT No.: PCT/GB2020/052902
§ 371 (c)(1),
(2) Date: May 27, 2022

(87) PCT Pub. No.: WO2021/105648
PCT Pub. Date: Jun. 3, 2021

(65) Prior Publication Data
US 2023/0004346 A1 Jan. 5, 2023

(30) Foreign Application Priority Data
Nov. 29, 2019 (GB) ..................................... 1917423

(51) Int. Cl.
*G06F 5/00* (2006.01)
*G06F 5/08* (2006.01)
(Continued)

(52) U.S. Cl.
CPC ................ *G06F 5/12* (2013.01); *G06F 5/085* (2013.01); *G06F 9/3004* (2013.01); *G06F 9/544* (2013.01)

(58) Field of Classification Search
None
See application file for complete search history.

(56) References Cited

U.S. PATENT DOCUMENTS 10,089,339 B2 * 10/2018 Liljedahl ................. H04L 47/36
10,353,629 B2 * 7/2019 Liljedahl ................... G06F 9/52
(Continued)

OTHER PUBLICATIONS

Pirkelbauer Peter, et al., "A Portable Lock-Free Bounded Queue", Nov. 25, 2016 (Nov. 25, 2016), Pervasive: International Conference on Pervasive Computing; [Lecture Notes in Computer Science; Lect.Notes Computer], Springer, Berlin, Heidelberg, pp. 55-73, XP047368943, ISBN: 978-3-642-17318-9 [retrieved on Nov. 25, 2016] p. 60-p. 61.
(Continued)

*Primary Examiner* — Henry Tsai
*Assistant Examiner* — Dean Phan
(74) *Attorney, Agent, or Firm* — NIXON & VANDERHYE P.C.

(57) ABSTRACT

Data processing apparatuses, methods of data processing, complementary instructions and programs related to ring buffer administration are disclosed. An enqueuing operation performs an atomic compare-and-swap oper-ation to store a first processed data item indication to an enqueuing-target slot in the ring buffer contingent on an in-order marker not being present there and, when successful, determines that a ready-to-dequeue condition is true for the first processed data item indication. A dequeuing operation, when the ready-to-de-queue condition for a dequeuing-target slot is true, comprises writing a null data item to the dequeuing-target slot and, when dequeuing in-order, further comprises, dependent on whether a next contiguous slot has null content, determining a retirement condition and, when the retirement condition is true, performing a retirement process on the next contiguous slot comprising making the next con-tiguous slot available to a subsequent enqueuing operation. Further subsequent slots may also be retired.

21 Claims, 17 Drawing Sheets

(51) Int. Cl.
    *G06F 5/12*     (2006.01)
    *G06F 9/30*     (2018.01)
    *G06F 9/54*     (2006.01)

(56)     References Cited

U.S. PATENT DOCUMENTS

| | | |
|---|---|---|
| 2003/0163660 A1 | 8/2003 | Lam |
| 2006/0123156 A1 | 6/2006 | Moir et al. |
| 2018/0081624 A1 | 3/2018 | Liljedahl |
| 2019/0227713 A1 | 7/2019 | Parthasarathy |
| 2021/0019261 A1* | 1/2021 | Tsirkin ................ G06F 9/45545 |

OTHER PUBLICATIONS

Steven Feldman, et al. "A wait-free multi-producer multi-consumer ring buffer", ACM SIGAPP Applied Computing Review, ACM, 2 Penn Plaza, Suite 701 New York NY 10121-0701 USA, vol. 15, No. 3, Oct. 13, 2015 (Oct. 13, 2015), pp. 59-71, XP058075959, ISSN: 1559-6915, DOI: 10.1145/2835260.2835264 p. 60-p. 61.
Arnautov Sergei, et al., "FFQ: A Fast Single-Producer/Multiple-Consumer Concurrent FIFO Queue", 2017 IEEE International Parallel and Distributed Processing Symposium (IPDPS), IEEE, May 29, 2017 (May 29, 2017), pp. 907-916, XP033114000, DOI: 10.1109/IPDPS.2017.41 p. 911, right-hand column, last paragraph.

\* cited by examiner

ELEMENT ORDERING HANDLING IN A RING BUFFER

The present disclosure relates to data processing. More particularly it relates to the administration of a ring buffer in a data processing apparatus.

There are various data processing contexts in which data items have an associated ordering which must be respected. However, where those data items are subjected to data processing, and in particular for parallelised concurrent processing of the data items, the order in which processing on the data items is completed may not correspond to the specific order of the data items. For example in a network environment in which data packets are received, processed and passed further, the parallelised processing of the data packets may result in a processing completion order which does not automatically equal the dispatch order of those data packets. However, preserving the original packet order is important as many network protocols do not handle packet reordering well. Late or reordered packets will often be treated as lost and retransmission may be requested, which decreases throughput and can cause extra traffic and processing. One technique in this context is to provide a ring buffer which can hold data items in a queued sequence, reserving enumerated slots in the ring buffer corresponding to the order which must be preserved for the data items being handled. Such a ring buffer array may be administered using head and tail pointers (typically scalars, which are bit-wise ANDed with a suitable mask and used as indices into the ring buffer array), together with a change indicator variable. The head pointer indicates the first missing element and the tail pointer indicates the last element plus one. When the first missing element is inserted into the ring buffer array, subsequent (and contiguous) waiting elements which are already present can also be retired. The change indicator is updated whenever an out-of-order element is inserted and is used to synchronise between different processes handling the processing of different data elements. Thus, an out-of-order process can indicate to an in-order thread and vice versa. An in-order thread or process which is retiring elements from the head of the queue of elements in the ring buffer can refer to the change indicator to determine if a scan for further in-order elements have become available in the ring buffer in parallel and therefore may now also be retired. In some approaches for a non-blocking reorder buffer design (such as is disclosed in US patent application publication US-2018-0081624) the head pointer and change indicator are co-located so that they can be operated on using the same compare-and-swap operation, which needs to fail if either has been updated, since this indicates that the action of a concurrent process has changed the status of the ring buffer content whilst this process has been going on. This means that one location is updated for every element inserted into the ring buffer and this can lead to a scalability bottleneck. Generally, however in any parallelised data processing environment operating on such a shared ring buffer, efficient sharing of the ring buffer resource, in particular allowing concurrent access to different slots of the ring buffer, is essential in order to support useful parallelisation of the data processing. However, it is important that (where possible) locking mechanisms which block access by other processing elements are avoided as far as possible, since these do not scale well into a multiple processing element environment. Indeed some benchmarking has even shown that negative scalability, wherein throughput decreases as more threads attempt to access a shared reorder buffer, can result under the use of certain locking mechanisms. Conversely, merely dedicating a single processing thread to handle all processing will also simply result in a single-threaded bottleneck.

At least some examples herein provide a data processing apparatus comprising ring buffer storage circuitry to store components of a ring buffer comprising multiple slots to hold queued data items; and data processing circuitry to perform an enqueuing operation to add one or more processed data item indications to the ring buffer and to perform a dequeuing operation to remove one or more processed data item indications from the ring buffer, wherein the enqueuing operation comprises performing an atomic compare-and-swap operation to store a first processed data item indication to an enqueuing-target slot in the ring buffer contingent on an in-order marker not being present in the enqueuing-target slot and, when the in-order marker is present in the enqueuing-target slot, determining a ready-to-dequeue condition to be true for the first processed data item indication, and wherein the dequeuing operation comprises, when the ready-to-dequeue condition for a dequeuing-target slot is true: writing a null data item to the dequeuing-target slot; and when removing the one or more processed data item indications from the ring buffer in-order, the dequeuing operation further comprises: a) dependent on whether a next contiguous slot has null content, determining a retirement condition and, when the retirement condition is true, performing a retirement process on the next contiguous slot comprising making the next contiguous slot available to a subsequent enqueuing operation; b) repeating step a) through subsequent slots until for a reached slot the retirement condition is not true; c) performing an atomic compare-and-swap operation to store the in-order marker to the reached slot contingent on content of the reached slot; and d) when the atomic compare-and-swap operation to store the in-order marker to the reached slot fails, performing the retirement process on the reached slot and returning to step a), wherein the next contiguous slot is now treated as a slot which contiguously follows the reached slot.

At least some examples herein provide a method of data processing comprising: storing components of a ring buffer comprising multiple slots to hold queued data items; performing an enqueuing operation to add one or more processed data item indications to the ring buffer; performing a dequeuing operation to remove one or more processed data item indications from the ring buffer, wherein the enqueuing operation comprises performing an atomic compare-and-swap operation to store a first processed data item indication to an enqueuing-target slot in the ring buffer contingent on an in-order marker not being present in the enqueuing-target slot and, when the in-order marker is present in the enqueuing-target slot, determining a ready-to-dequeue condition to be true for the first processed data item indication, and wherein the dequeuing operation comprises, when the ready-to-dequeue condition for a dequeuing-target slot is true: writing a null data item to the dequeuing-target slot; and when removing the one or more processed data item indications from the ring buffer in-order, the dequeuing operation further comprises: a) dependent on whether a next contiguous slot has null content, determining a retirement condition and, when the retirement condition is true, performing a retirement process on the next contiguous slot comprising making the next contiguous slot available to a subsequent enqueuing operation; b) repeating step a) through subsequent slots until for a reached slot the retirement condition is not true; c) performing an atomic compare-and-swap operation to store the in-order marker to the reached slot contingent on content of the reached slot; and d) when the atomic compare-and-swap operation to store the in-order marker to the reached slot fails, performing the retirement process on the reached slot and returning to step a), wherein the next contiguous slot is now treated as a slot which contiguously follows the reached slot.

At least some examples herein provide a data processing apparatus comprising: instruction decoder circuitry to decode instructions and to generate control signals dependent on the instructions; and data processing circuitry to perform data processing operations in response to the control signals, wherein the instruction decoder circuitry is responsive to an atomic sequence number compare-and-swap-max instruction specifying a data item location and a write-attempt value to generate the control signals such that the data processing circuitry seeks to perform a write operation of the write value to the data item location, wherein success of the write operation is contingent on the write-attempt value being greater than a current value at the data item location, wherein values are treated as a wrap-around enumeration of sequence numbers which wraps around from a numerically largest sequence number to a numerically smallest sequence number, and wherein the data processing circuitry is responsive to the control signals to determine that the write-attempt value is greater than the current value when the write-attempt value is ahead of the current value in the wrap-around enumeration by less than half of the numerically largest sequence number.

At least some examples herein provide a method of data processing comprising: decoding instructions and generating control signals dependent on the instructions; performing data processing operations in response to the control signals, wherein the decoding instructions comprises, in response to an atomic sequence number compare-and-swap-max instruction specifying a data item location and a write-attempt value: generating the control signals such that the performing data processing seeks to perform a write operation of the write value to the data item location, wherein success of the write operation is contingent on the write-attempt value being greater than a current value at the data item location, wherein values are treated as a wrap-around enumeration of sequence numbers which wraps around from a numerically largest sequence number to a numerically smallest sequence number, and wherein the performing data processing further comprises, in response to the control signals: determining that the write-attempt value is greater than the current value when the write-attempt value is ahead of the current value in the wrap-around enumeration by less than half of the numerically largest sequence number.

At least some examples herein provide a computer program for controlling a host data processing apparatus to provide an instruction execution environment comprising: instruction decoder logic to decode instructions and to generate control signals dependent on the instructions; and data processing logic to perform data processing operations in response to the control signals, wherein the instruction decoder logic is responsive to an atomic sequence number compare-and-swap-max instruction specifying a data item location and a write-attempt value to generate the control signals such that the data processing logic seeks to perform a write operation of the write value to the data item location, wherein success of the write operation is contingent on the write-attempt value being greater than a current value at the data item location, wherein values are treated as a wrap-around enumeration of sequence numbers which wraps around from a numerically largest sequence number to a numerically smallest sequence number, and wherein the data processing logic is responsive to the control signals to determine that the write-attempt value is greater than the current value when the write-attempt value is ahead of the current value in the wrap-around enumeration by less than half of the numerically largest sequence number.

The present techniques will be described further, by way of example only, with reference to embodiments thereof as illustrated in the accompanying drawings, to be read in conjunction with the following description, in which:

FIG. 1 schematically illustrates a data processing apparatus in accordance with some embodiments;

FIG. 2 schematically illustrates a ring buffer in accordance with some embodiments;

FIG. 3 schematically illustrates a ring buffer to which producer processes and consumer processes have access, with reference to respective producer head and tail pointers and consumer head and tail pointers, in accordance with some embodiments;

FIG. 4 is a flow diagram showing a sequence of steps which are taken in the method of some embodiments of the present disclosure in order to carry out an enqueuing operation;

FIG. 5 schematically illustrates a sequence of steps which are taken in the method of some embodiments when a dequeuing operation is carried out;

FIG. 6 shows a sequence of steps which are taken in the method of some embodiments when an enqueuing operation and subsequent dequeuing operation are carried out by one process;

FIG. 7 schematically illustrates a reorder buffer example in some embodiments, showing an example sequence of the evolution of content of the reorder buffer slots;

Figure 11:
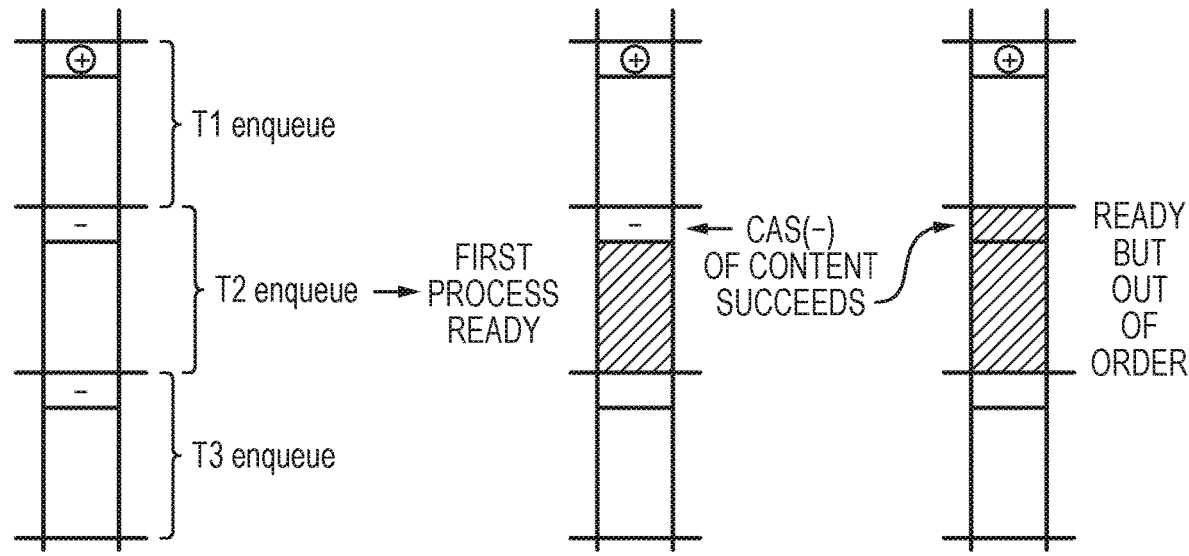
Figure 12:
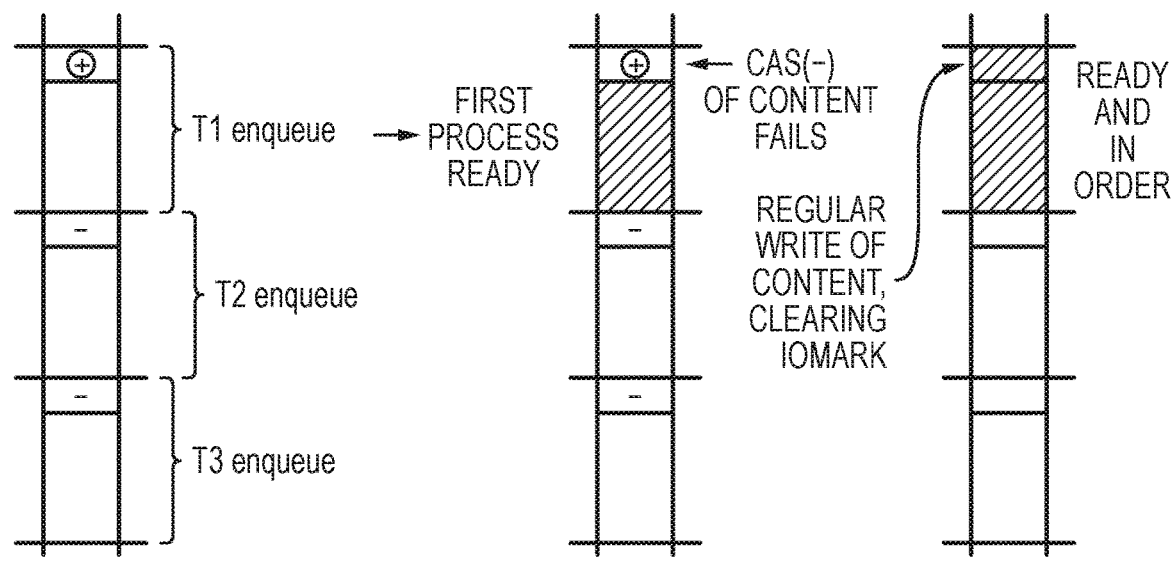
Figure 13:
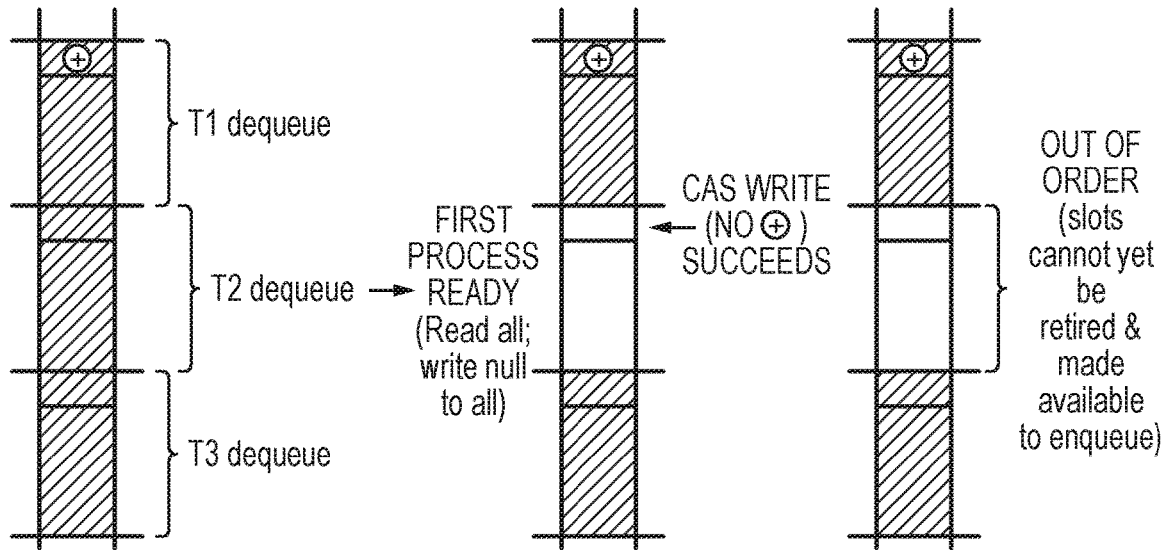
Figure 14:
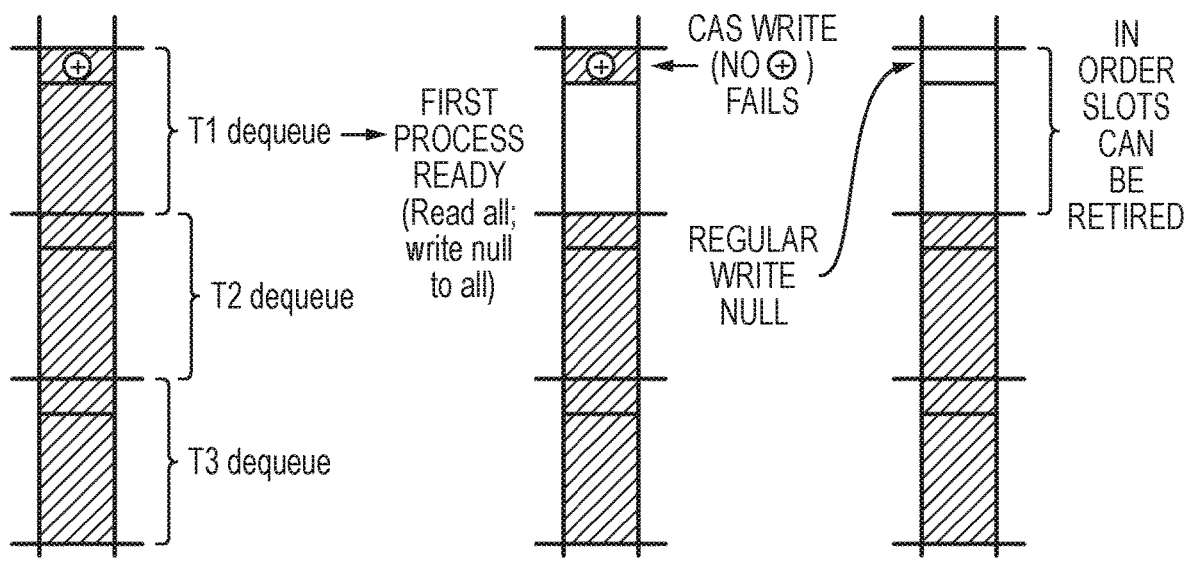
Figure 15:
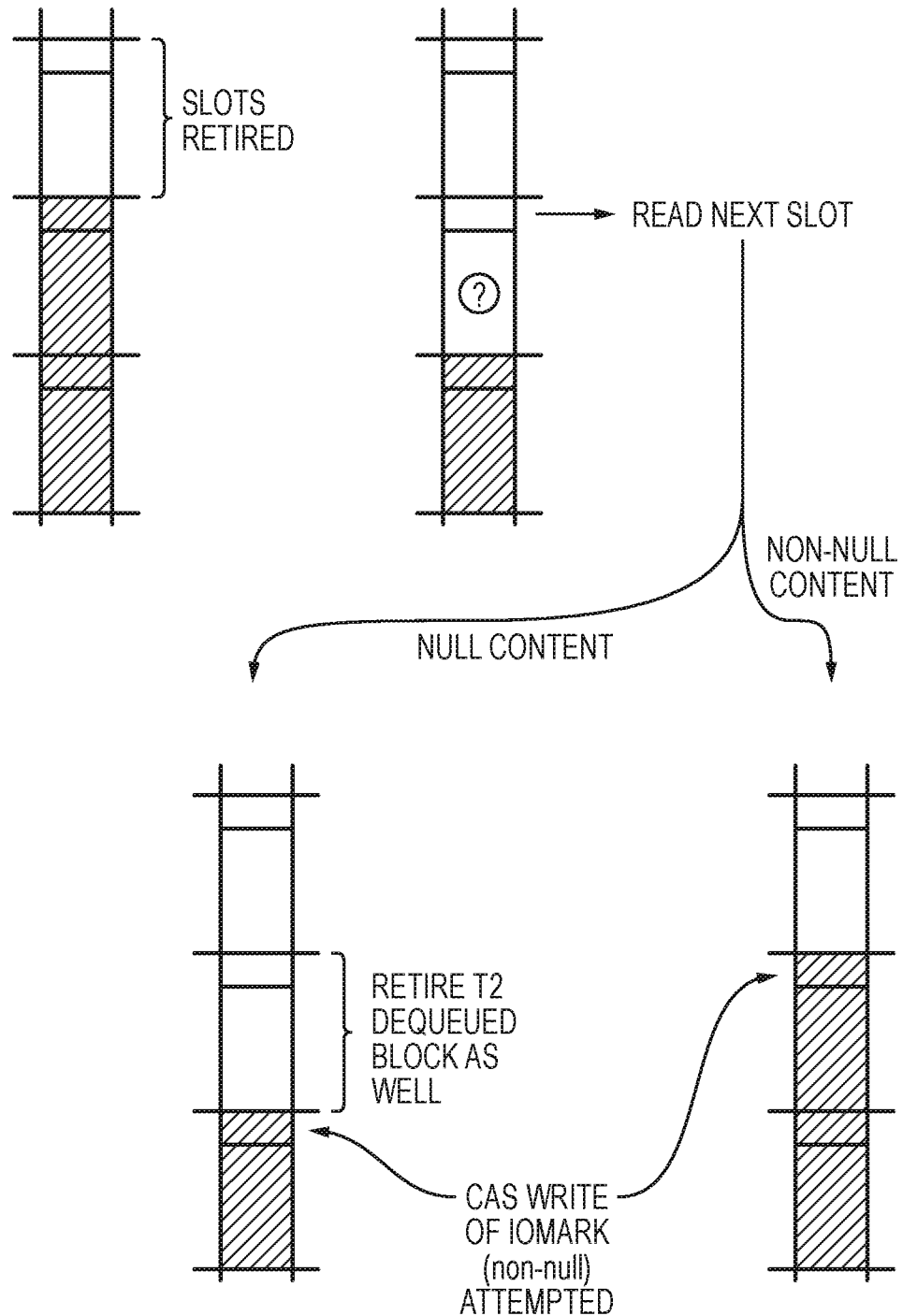
Figure 16:
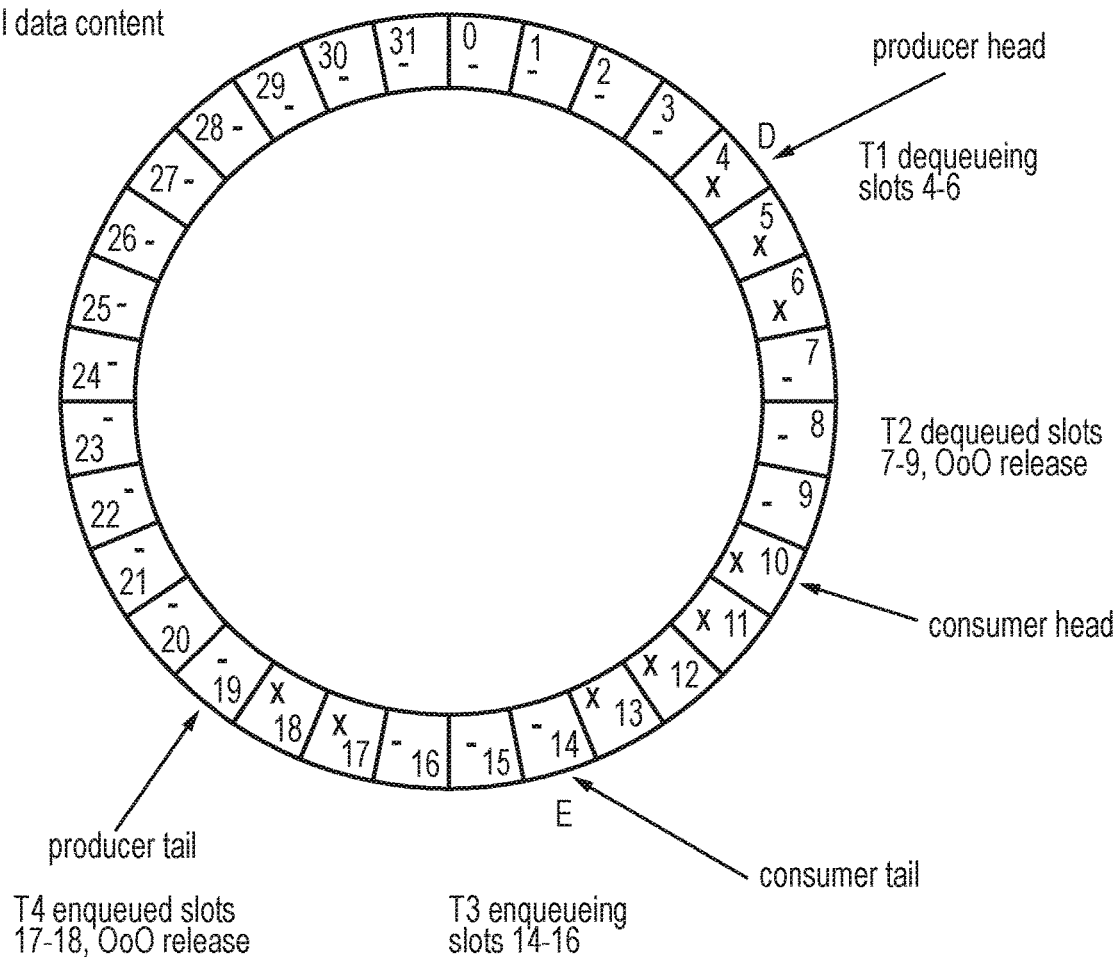
Figure 17A:
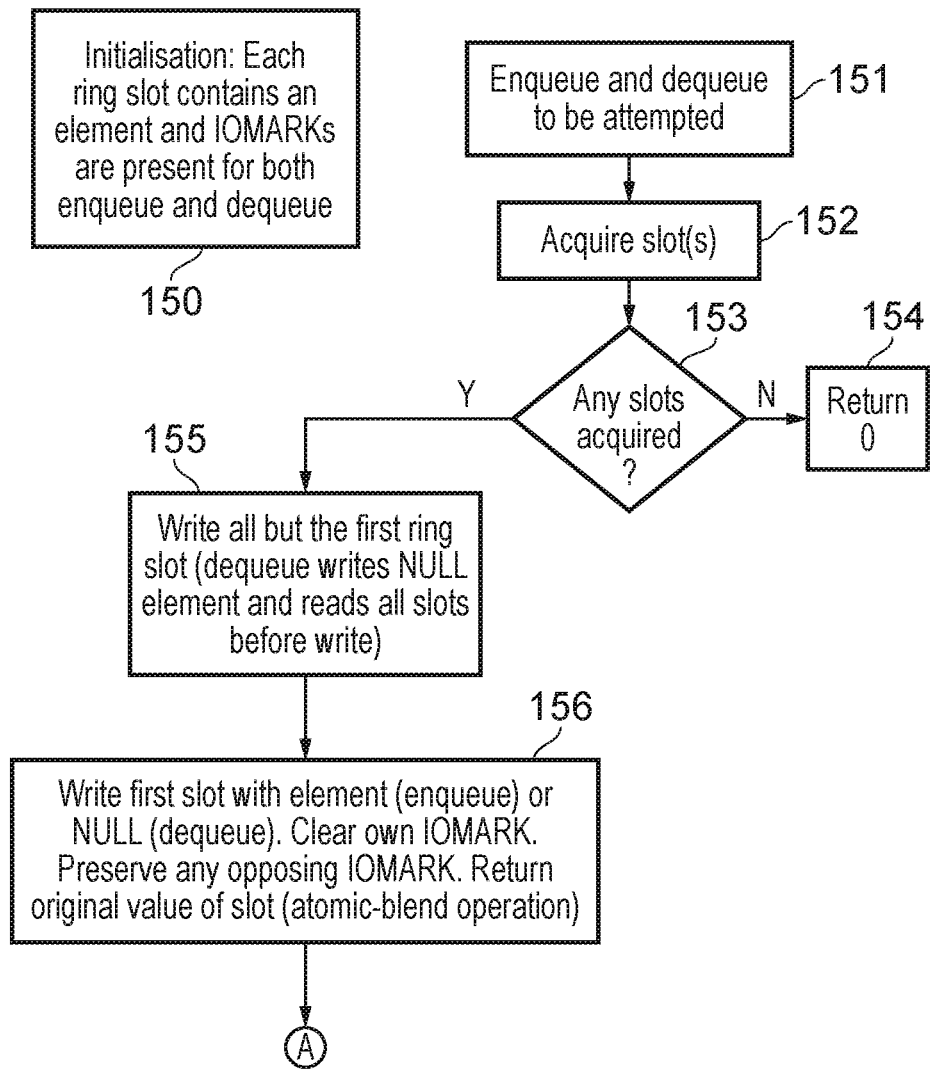
Figure 17B:
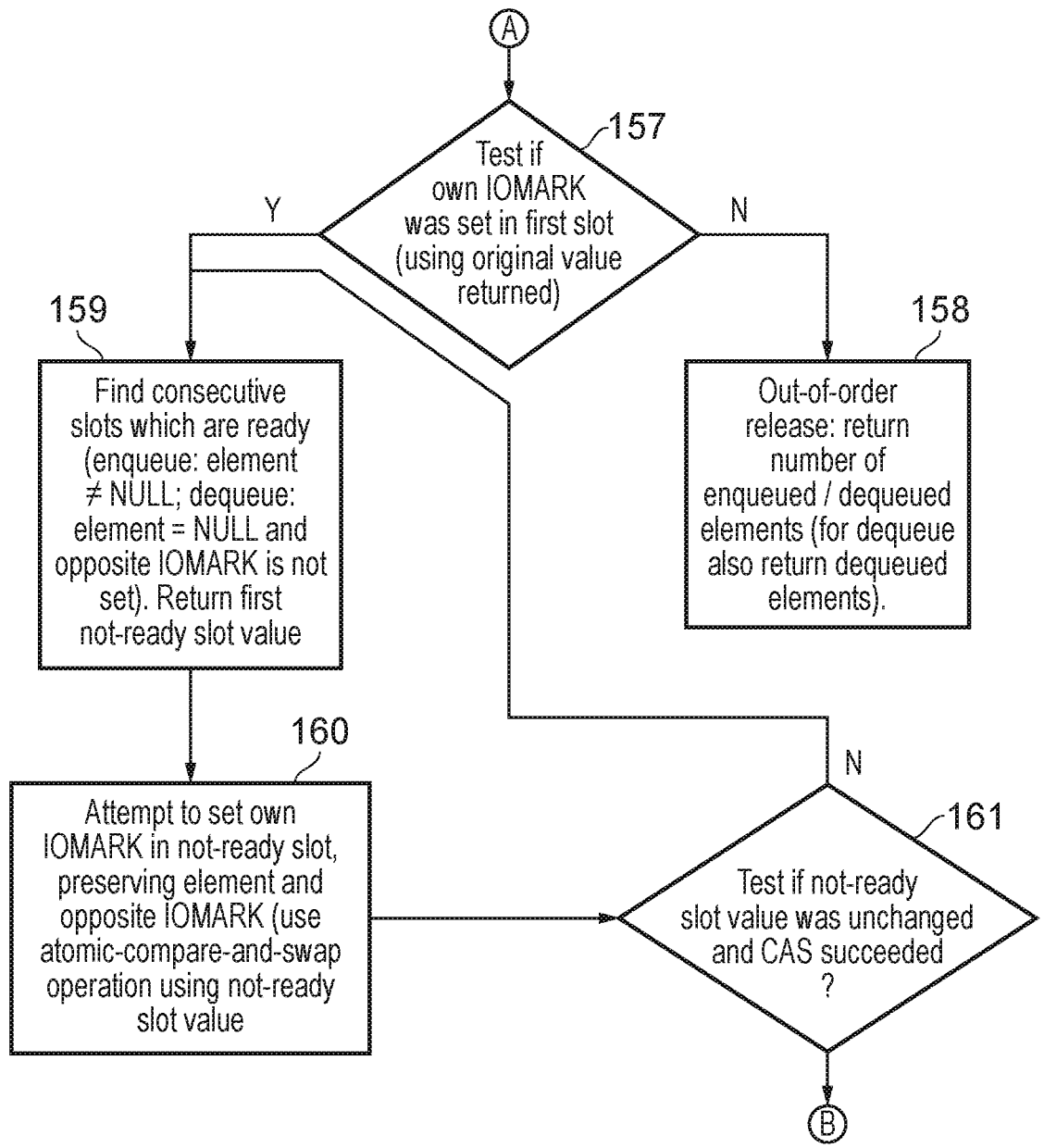
Figure 17C:
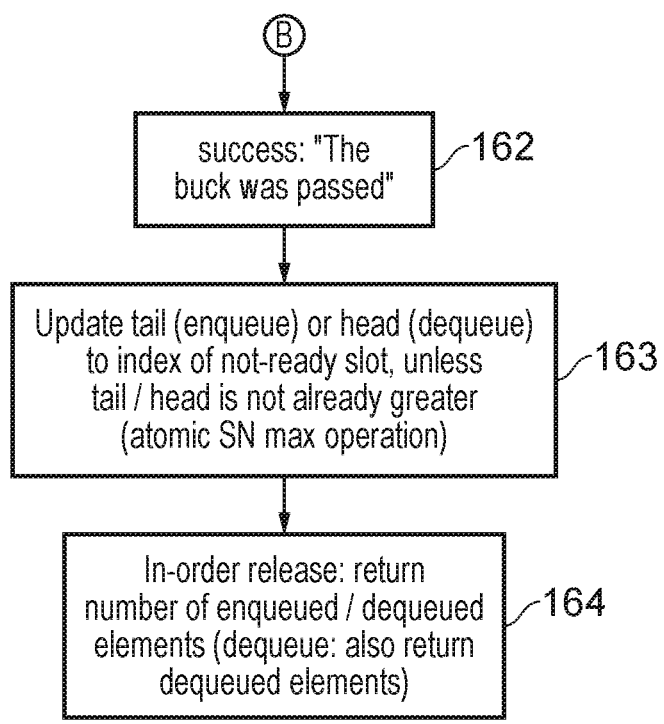
Figure 18:
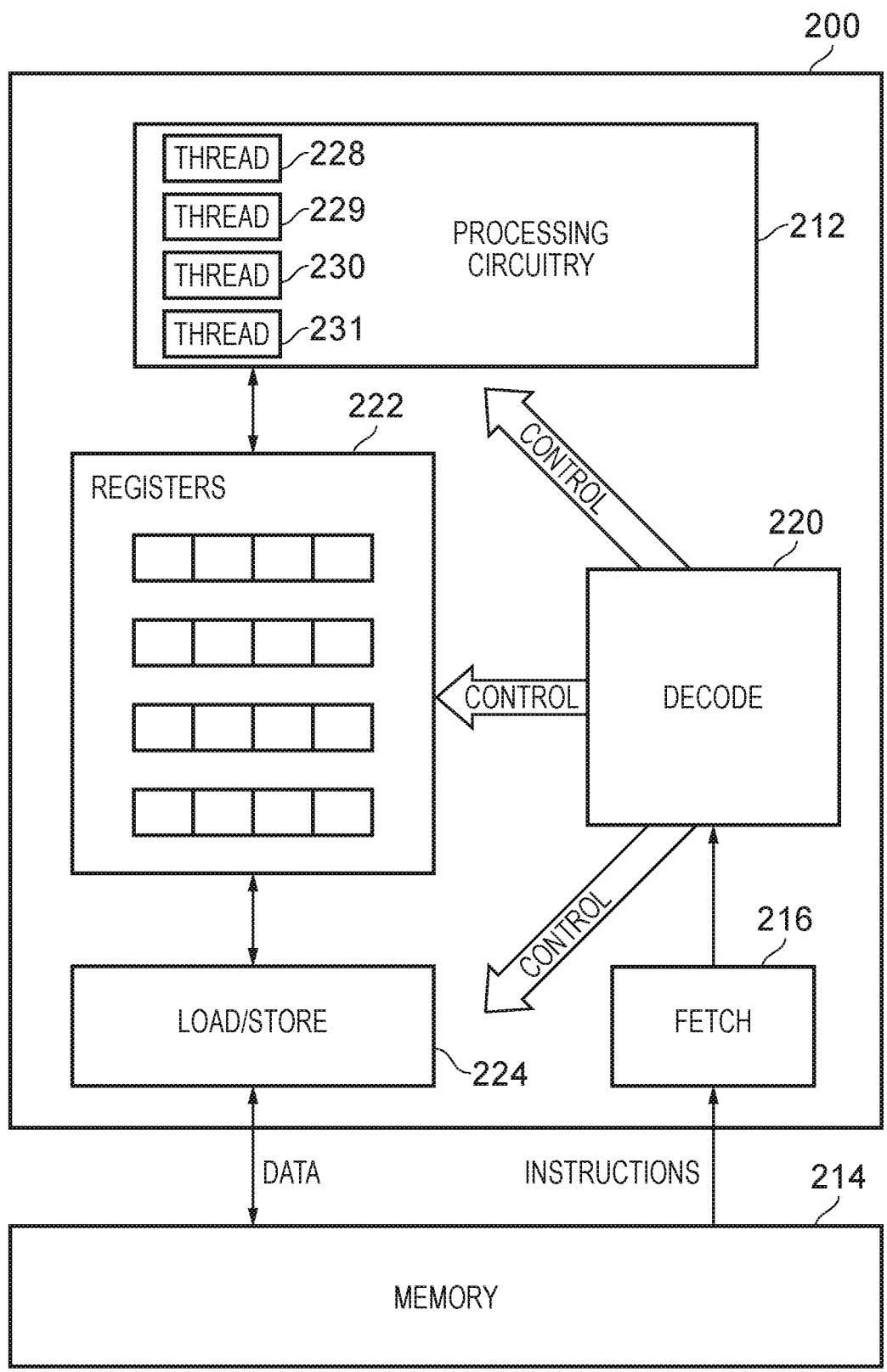
Figure 19:
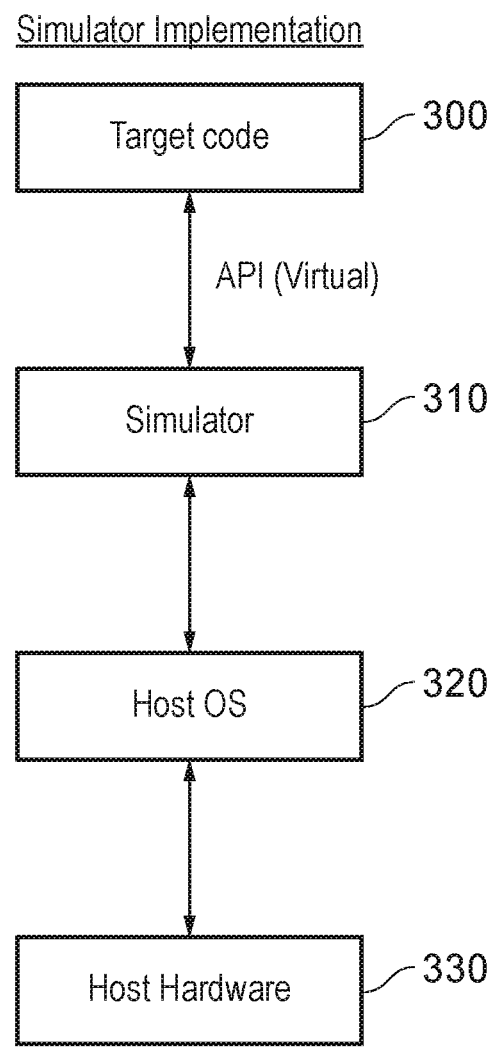

FIG. 11 schematically illustrates the evolution of content of a ring buffer accessed by multiple parallel processes to enqueue data items in which the first set of data items is enqueued out of order;

FIG. 12 schematically illustrates the evolution of content in a ring buffer in which parallel processes are carrying out enqueuing operations and the first set of data items to be enqueued is in-order;

FIG. 13 schematically illustrates the evolution of content of a ring buffer in some embodiments in which parallel dequeuing processes take place and in which the first dequeuing process to complete has dequeued its allocated ring buffer slots out of order;

FIG. 14 schematically illustrates the evolution of content of a ring buffer in which parallel processes are carrying out dequeuing operations in some embodiments and in which the first process to complete has dequeued its allocated slots in order;

FIG. 15 schematically illustrates the evolution of content in a ring buffer in some embodiments in which slots have been dequeued in order and a further process is carried out in order to determine whether only the slots dequeued by this process are to be retired or whether further subsequent slots dequeued by a parallel process can now also be retired;

FIG. 16 schematically illustrates a ring buffer in accordance with some embodiments;

FIGS. 17A-C show a sequence of steps which are taken in the method of some embodiments when performing an enqueuing process or a dequeuing process with respect to a ring buffer;

FIG. 18 schematically illustrates a data processing apparatus in accordance with some embodiments; and FIG. 19 schematically illustrates the components of a system which provides a simulator implementation in some embodiments.

At least some embodiments described herein provide a data processing apparatus comprising a data processing apparatus comprising: ring buffer storage circuitry to store components of a ring buffer comprising multiple slots to hold queued data items; and data processing circuitry to perform an enqueuing operation to add one or more processed data item indications to the ring buffer and to perform a dequeuing operation to remove one or more processed data item indications from the ring buffer, wherein the enqueuing operation comprises performing an atomic compare-and-swap operation to store a first processed data item indication to an enqueuing-target slot in the ring buffer contingent on an in-order marker not being present in the enqueuing-target slot and, when the in-order marker is present in the enqueuing-target slot, determining a ready-to-dequeue condition to be true for the first processed data item indication, and wherein the dequeuing operation comprises, when the ready-to-dequeue condition for a dequeuing-target slot is true: writing a null data item to the dequeuing-target slot; and when removing the one or more processed data item indications from the ring buffer in-order, the dequeuing operation further comprises: a) dependent on whether a next contiguous slot has null content, determining a retirement condition and, when the retirement condition is true, performing a retirement process on the next contiguous slot comprising making the next contiguous slot available to a subsequent enqueuing operation; b) repeating step a) through subsequent slots until for a reached slot the retirement condition is not true; c) performing an atomic compare-and-swap operation to store the in-order marker to the reached slot contingent on content of the reached slot; and d) when the atomic compare-and-swap operation to store the in-order marker to the reached slot fails, performing the retirement process on the reached slot and returning to step a), wherein the next contiguous slot is now treated as a slot which contiguously follows the reached slot.

Accordingly, the present techniques make use of an in-order marker which can be stored in the slots of the ring buffer in order to mediate communication between parallel processes carrying out enqueuing and dequeuing operations on data item indications stored in the ring buffer. Where reference here is made to data item indications it should be appreciated that these may in principle comprise the data items themselves, but in other examples these data item indications may for example be pointers to storage locations at which the respective data items are to be found. The storage and manipulation of data item indications (such as pointers) supports a more compact and thus easier administration of the ring buffer content. The use of the in-order marker of the present techniques supports scalability of the technique, because enqueuing operations to place processed data item indications into the ring buffer can be completed concurrently and the storage locations of these data items indications can be arranged to be within non-conflicting locations in a memory system (for example in separate cache lines), so that there isn't any single location which is written by all enqueuing processes and thus could lead to a scalability bottleneck. In parallel to this, dequeuing operations with respect to processed data items indications which have been stored in the ring buffer can also be carried out independently of one another, either because in embodiments in which the data items must strictly be removed in-order (such as in the example of a reorder buffer) by definition only one element can be carrying out the dequeuing operation on the ready processed data item indication at the head of the ring buffer, or in embodiments in which dequeuing operations are permitted to remove processed data item indications from the ring buffer out of order, the out-of-order nature of these dequeuing operations means that they are necessarily separate from one another. The only point of contention is when a process is inserting the first out-of-order element whilst the in-order process is trying to write the in-order marker to that specific ring slot. For clarity, note that a distinction is made between the process of dequeuing a data item and retiring the slot in which that data item (indication) was stored. For in-order dequeuing these processes are (usefully) closely linked, but when out-of-order dequeuing is carried out, a data item (indication) may be dequeued and then possibly only some time later (when all preceding data items (indications) have been dequeued) is the slot retired (and made available to an enqueuing operation).

Thus, the procedure of the enqueuing and dequeuing operations of the present techniques is essentially as follows. In the enqueuing process a data item indication to be added to a slot of the ring buffer is added making use of an atomic compare-and-swap operation, which is contingent on the in-order marker not being present in the target slot to be written to. This ensures that the enqueuing operation can proceed only when the data item indication is out-of-order and therefore the item must wait until at least one data item indication ahead of it is later written to the ring buffer before it can be dequeued. However, when the in-order marker is encountered by the enqueuing process, this indicates that the processed data item indication being written is at the head of the stored sequence and is ready to be dequeued. In this situation the process determines a "ready-to-dequeue" condition to be true.

In addition, the present techniques provide that when a dequeuing operation is carried out, and when the ready-to-dequeue condition for a slot currently being processed is true, that the slot can itself be cleared (writing a null data item thereto) and, when data items are being removed in order, a further task of the dequeuing operation is to examine a next contiguous slot to determine whether subsequent slots in the ring buffer can now be retired to be made available to a subsequent enqueuing operation. When all subsequent slots that can be retired in this manner have been processed the dequeuing operation seeks to write the in-order marker to the slot which has been reached (and itself is not yet ready to be retired to be made available for enqueuing). This storage of the in-order marker is also performed using an atomic compare-and-swap operation, contingent on the content of the reached slot. The use of this atomic compare-and-swap operation to store the in-order marker thus allows an identification of the above-mentioned situation in which a parallel process is currently seeking to write an out-of-order element to that reached slot, when in fact the in-order thread is seeking to update that slot with the in-order marker since it has now become the first in-order (head) slot in the ring buffer. Colloquially speaking therefore it can be seen that the use of the in-order marker in the ring buffer thus provides a "buck" which may be passed between concurrent processes accessing the ring buffer to carry out enqueuing and dequeuing operations, where this "buck" (the in-order marker) indicates the responsibility for dequeuing data item indications from the ring buffer, i.e. when this in-order marker is encountered by a process, the process knows that this marked slot represents the head of the queued data item indications in the ring buffer which therefore are immediately available for dequeuing.

In some embodiments the ring buffer is arranged as a reorder buffer, wherein the data processing circuitry is arranged to perform the enqueuing operation to add the one or more processed data item indications to the ring buffer when the processing of the data items is complete, and not to perform the dequeuing operation to remove the one or more processed data item indications from the ring buffer unless the one or more processed data item indications are in-order. The function of a reorder buffer is required to strictly preserve the ordering of the data item indications held in its slots and accordingly the present techniques support this in that the data processing circuitry does not perform the dequeuing operation unless the subject of the dequeuing operation is one or more in-order processed data items.

This may in particular be supported in some embodiments in which the data processing circuitry is responsive to the ready-to-dequeue condition being true for the first processed data item indication to commence the dequeuing operation with the dequeuing-target slot being where the first processed data item indication is to be found. Hence, when the ready-to-dequeue condition is true for the first processed data item indication, i.e. that data item indication which the enqueuing operation has just attempted to store to a slot in the ring buffer using the atomic compare-and-swap operation, the dequeuing operation is immediately commenced in order to dequeue this data item indication and release the slot in which it was stored for further usage.

In some embodiments in the dequeuing operation the retirement condition is determined to be true when the next contiguous slot does not have null content, and wherein making the next contiguous slot available to the subsequent enqueuing operation comprises retiring the next contiguous slot and writing null content to the next contiguous slot. Accordingly, in such embodiments the dequeuing operation thus dequeues the data item indication from its initial dequeuing-target slot (writing a null data item thereto) and further examines the next contiguous slot wherein when the next contiguous slot does not have null content, i.e. a data item indication has already been stored (out-of-order) by another process to that slot, the retirement condition is true and the content of that next continuous slot can then be similarly dequeued, writing null content to that slot and making it available to a subsequent enqueuing operation.

In some embodiments in the dequeuing operation the performing the atomic compare-and-swap operation to store the in-order marker to the reached slot is contingent on the reached slot having null content. Accordingly, a iterative process of examining subsequent contiguous slots, and retiring those which do not have null content, is carried out until a slot is reached which does have null content and the in-order marker is then stored in that slot in order to indicate to subsequent processes that this is now in the head of the ordered sequence of pending data item indications, although the data item for this reached slot is not yet ready. The "buck" is thereby passed to a subsequent process which will perform the required processing of this data item and recognise from the presence of the in-order marker in its slot in the ring buffer that it is dealing with the data item at the head of the stored ordered sequence, which is thus ready immediately to be dequeued.

In some embodiments the ring buffer is arranged as a FIFO queue, and the data processing circuitry is arranged to support multiple concurrent enqueuing processes to perform enqueuing operations and to support multiple concurrent dequeuing processes to perform dequeuing operations. Accordingly, in the presence of multiple concurrent enqueuing processes (which may be referred to as "producers" for the FIFO queue) and multiple concurrent dequeuing processes (which may be referred to as "consumers" of the content of the FIFO queue) the present techniques can support a non-blocking administration of such a ring buffer based FIFO queue.

In some embodiments the data processing circuitry is arranged to allocate a unique set of enqueuing slots to each of the multiple concurrent enqueuing processes and to allocate a unique set of dequeuing slots to each of the multiple concurrent dequeuing processes. Accordingly, it will be understood that the usage of such a ring buffer based FIFO queue involves a different approach to the usage of the slots of the ring buffer in that a set of slots is allocated to an enqueuing operation which then can freely store processed data items into these slots, but then (as above) the ordering of the slots in the ring buffer then preserves the ordering of the data item indications stored in those slots, such that when they are dequeued the ordering is preserved. Nevertheless, the approach also involves allocating sets of dequeuing slots to the dequeuing processes and in such embodiments out-of-order dequeuing of stored data item indications is possible, although the slots themselves cannot be retired and therefore made available to a subsequent enqueuing process until they are in-order.

In some embodiments the enqueuing-target slot is a first slot of the unique set of enqueuing slots and the enqueuing operation comprises writing processed data item indications to the unique set of enqueuing slots other than enqueuing-target slot before performing the atomic compare-and-swap operation to store the first processed data item indication to the enqueuing-target slot. Thus, when the enqueuing operation seeks to write processed data item indications to the set of enqueuing slots it has been allocated, the present techniques further recognise that contention with another process is only possible with respect to the first slot of the unique set of enqueuing slots. This is because access to the set of enqueuing slots is essentially unique to the enqueuing process, but it is possible for another process, specifically another dequeuing process, to access that first slot in parallel, because from the perspective of that dequeuing process this first slot may be the slot it has reached at the conclusion of its dequeuing process and into which it is seeking to store the in-order marker. This being the case, the use of the atomic compare-and-swap operation by the enqueuing process is usefully limited to only that first slot (being the only slot where such contention could occur) and such that the enqueuing process can identify whether the in-order marker is present and therefore that the ready-to-dequeue condition is now true for the first processed data item indication in the set of enqueuing slots and therefore also for the full set of enqueued data items in this set.

Thus, in some such embodiments, when the in-order marker is present in the enqueuing-target slot and the ready-to-dequeue condition is true for the first processed data item indication, the enqueuing operation further comprises a further step of writing the first processed data item indication to the enqueuing-target slot. Thus, the presence of the in-order marker will cause the atomic compare-and-swap operation seeking to store the first processed data item indication to fail and as a result the first processed data item can be written to the enqueuing target slot (whereby it should be noted that when a compare-and-swap operations fails due to in-order marker being present, a regular write (non-CAS) of the data item is performed, overwriting the in-order marker). This set of enqueued data item indications is then (as a block) ready for dequeuing, this fact having being indicated by the in-order marker that was at its head.

In some embodiments the dequeuing process further comprises: reading the content of the unique set of dequeuing slots; writing the null data item to the unique set of dequeuing slots other than the dequeuing-target slot; and performing an atomic compare-and-swap operation to store the null data item to the dequeuing-target slot in the ring buffer contingent on an in-order marker not being present in the dequeuing-target slot and, when the in-order marker is present in the dequeuing-target slot, determining that the content of the unique set of dequeuing slots is being removed from the ring buffer in-order, and when the in-order marker is not present in the dequeuing-target slot, determining that the content of the unique set of dequeuing slots is being removed from the ring buffer out-of-order and concluding the dequeuing process.

Accordingly, in such embodiments in which a set of slots is dequeued together by a dequeuing process to which that set of slots has been allocated, these slots may be determined to be being dequeued either in-order (i.e. comprising the head of the queued set of data item indications) or out-of-order (i.e. not including the head of the queued data item indications). The present techniques enable this determination to be made, whilst minimising the potential for contention, by performing a read of the content of the unique set of dequeuing slots by the dequeuing process and then writing the null data item to the set of dequeuing slots other than the dequeuing-target slot (i.e. the first of the unique set of dequeuing slots) using a "normal" (unconditional) write, and storing the null data item to the first slot of the unique set using the atomic compare-and-swap operation contingent on an in-order marker not being present in that slot. Accordingly, when this atomic compare-and-swap operation is successful (i.e. the in-order marker is not present), it can be determined that this set of dequeuing slots has been dequeued out-of-order and the dequeuing process can conclude at that point. Conversely, when the in-order marker is present (causing the atomic compare-and-swap operation to fail) it can be determined that this first slot of the set of dequeuing slots is in fact the head of the queued data item indications, which are therefore being dequeued in-order.

In some such embodiments, when removing the content of the unique set of dequeuing slots in-order, in the dequeuing operation the retirement condition is determined to be true when the next contiguous slot has null content, and wherein making the next contiguous slot available to the subsequent enqueuing operation comprises retiring a set of next contiguous slots which have null content. Where it is determined that the set of dequeuing slots has been dequeued in-order, this therefore means that it can be examined if further slots beyond this set of dequeuing slots is are also available for retirement and this is determined by examining the next contiguous slot to see if it has null content. Specifically, when the next contiguous slot has null content this means that another dequeuing process has already removed this content from the ring buffer, albeit out of order, and where the head of the queue has now reached this point this subsequent slot (or these subsequent slots) can also be retired to be made available to a subsequent enqueuing operation now that they have become in-order.

Conversely, when the next contiguous slot is examined and it is found not to have null content, this means that this next contiguous slot is still pending a dequeuing process and the current dequeuing process therefore will attempt to store the in-order marker to this slot to indicate to that subsequent dequeuing process that this is now the head of the queue. Accordingly, in some embodiments in the dequeuing operation the performing the atomic compare-and-swap operation to store the in-order marker to the reached slot is contingent on the reached slot not having null content. This approach allows for the possibility of contention with another process, in that whilst this reached slot does not have null content (i.e. it has a data item indication pending dequeuing), then it is appropriate for the in-order marker to be stored there. However the possibility exists for another process to have dequeued this data item indication immediately prior to the dequeuing operation seeking to store the in-order marker there and if this has happened, and therefore the atomic compare-and-swap operation to store the in-order marker fails, then the dequeuing process recognises this and can also continue to retire these subsequent (contiguous) slots with null content until a slot with content is again reached.

In some embodiments the data processing circuitry is arranged to perform an initialisation operation to store the in-order marker to a defined first slot of the ring buffer and to store null data content to all of the multiple slots of the ring buffer. This thus sets up the full content of the ring buffer such that the above-described techniques can be carried out. Note that when the data processing circuitry is performing an initialisation operation to set up the content of the ring buffer for separate enqueuing and dequeuing operations, then two in-order markers (one for each) are used. In other words, in some embodiments the in-order marker comprises an enqueue in-order marker and a dequeue in-order marker. Thus initialised the above-described techniques can be carried out without consideration having to be taken of any prior content of the slots.

The null data content may be represented in a variety of ways but in some embodiments the null data content is a null pointer.

The processed data item indications which are stored in the slots of the ring buffer may be configured in a variety of ways, but in some embodiments the processed data item indications are memory aligned such that at least one lower order bit of the processed data item indications is functionally irrelevant to the processed data item indications, and the in-order marker is represented by the at least one lower order bit. Thus, the memory alignment (e.g. word alignment), means that one or more bits at the lower order end of the indication is functionally irrelevant in that variation in these bits does not change the alignment boundary to which the processed data item indication points. This therefore makes these bits available for another purpose, where here these are used to store the in-order marker(s). Accordingly, within a given slot both a data item indication and the in-order marker(s) can be stored without conflict. Indeed in principle only one bit is required to indicate the in-order marker, where for example a set bit can indicate the presence of the in-order marker and a non-set bit can indicate its absence (noting that this definition could of course be trivially inverted) and thus only one lower order bit of the data item indications is required for this purpose. However, more may be used for the purpose of redundancy and therefore resilience to bit errors. Also in embodiments in which respective in-order markers are used for enqueue and for dequeue, a defined bit can indicate each.

In some embodiments the data processing apparatus further comprises a cache associated with a data processing circuitry, wherein the data processing circuitry is arranged to performed a swizzle operation on a set of lower order bits of sequence numbers used to enumerate the multiple slots of the ring buffer to generate the memory addresses of the multiple slots, wherein a size of the set of lower order bits is selected in dependence on a cache line size of the cache. It will be recognised that a cache associated with the data processing circuitry will commonly be provided in order to reduce the impact of the latency associated with accessing data items or data item indications in memory, and when such a cache is present the present techniques propose that a swizzle operation, i.e. an operation rearranging elements of the set of lower order bits, may be performed on a set of lower order bits of sequence numbers which are used to enumerate the multiple slots of the ring buffer when generating corresponding memory addresses used for each of the respective multiple slots of the reorder buffer. This therefore means that adjacently numbered slots are not stored at adjacent memory addresses and when the size of the set of lower ordered bits within which this swizzle operation take place is selected in dependence on a cache line size of the cache, this means that it can be ensured that adjacent slots in the ring buffer are stored in different cache lines of the cache. This further helps to decrease write contention between different processes concurrently accessing adjacent ring buffer slots. Nevertheless it should be recognised that conversely there may be circumstances in which the spatial locality of adjacent ring buffer slots in memory may itself be beneficial and accordingly each implementation can choose an appropriate trade off between these factors, which may be varied depending on the size of the set of lower order bits to which the swizzle operation is applied.

In some embodiments the dequeuing operation further comprises, when the atomic compare-and-swap operation to store the in-order marker to the reached slot succeeds, incrementing a head pointer indicative of a current head slot of the multiple slots of the ring buffer by a total number of slots retired in the dequeuing operation. A head pointer therefore provides a centralised reference by which processes can identify the current head slot of the multiple slots of the ring buffer, without needing to access the content of the ring buffer itself.

Nevertheless, where this head pointer is therefore a shared resource which could lead to contention between multiple processes, in some embodiments incrementing the head pointer is an atomic compare-and-swap-max operation, wherein success of the atomic compare-and-swap-max operation is contingent on a write-attempt value of the head pointer being greater than a current value of the head pointer. Where such an operation is contingent on the write-attempt value being greater than the current value of the target of the operation, this ensures that if two (or more) processes concurrently try to update the head pointer, only the process seeking to update it to its largest value will be successful and the failure of the atomic compare-and-swap operation for another process indicates to that process that the head pointer has in fact already been moved on further.

The present techniques further propose that, for example in the context of a ring buffer in which sequence numbers are used and wrap around (i.e. the numerically largest sequence number is followed by the numerically smallest sequence number), such a compare-and-swap-max operation is beneficially provided if it can take this type of enumeration into account. Accordingly in some embodiments incrementing the head pointer is an atomic sequence number compare-and-swap-max operation, wherein success of the atomic sequence number compare-and-swap-max operation is contingent on a write-attempt value of the head pointer being greater than a current value of the head pointer wherein a wrap-around enumeration of the multiple slots of the ring buffer wraps around from a numerically largest sequence number to a numerically smallest sequence number, and wherein the atomic sequence number compare-and-swap-max operation is arranged to determine that the write-attempt value is greater than the current value when the write-attempt value is ahead of the current value in the wrap-around enumeration by less than half of the numerically largest sequence number. This thus enables the updating of the head pointer to be correctly carried out even though the wrap-around boundary of the numbering of the slots may be crossed as part of that update.

In some example embodiments there is a method of data processing comprising: storing components of a ring buffer comprising multiple slots to hold queued data items; performing an enqueuing operation to add one or more processed data item indications to the ring buffer; performing a dequeuing operation to remove one or more processed data item indications from the ring buffer, wherein the enqueuing operation comprises performing an atomic compare-and-swap operation to store a first processed data item indication to an enqueuing-target slot in the ring buffer contingent on an in-order marker not being present in the enqueuing-target slot and, when the in-order marker is present in the enqueuing-target slot, determining a ready-to-dequeue condition to be true for the first processed data item indication, and wherein the dequeuing operation comprises, when the ready-to-dequeue condition for a dequeuing-target slot is true: writing a null data item to the dequeuing-target slot; and when removing the one or more processed data item indications from the ring buffer in-order, the dequeuing operation further comprises: a) dependent on whether a next contiguous slot has null content, determining a retirement condition and, when the retirement condition is true, performing a retirement process on the next contiguous slot comprising making the next contiguous slot available to a subsequent enqueuing operation; b) repeating step a) through subsequent slots until for a reached slot the retirement condition is not true; c) performing an atomic compare-and-swap operation to store the in-order marker to the reached slot contingent on content of the reached slot; and d) when the atomic compare-and-swap operation to store the in-order marker to the reached slot fails, performing the retirement process on the reached slot and returning to step a), wherein the next contiguous slot is now treated as a slot which contiguously follows the reached slot.

The present techniques further propose that the above-mentioned atomic sequence number compare-and-swap-max operation may usefully be established as a dedicated instruction recognised by a data processing apparatus. Accordingly, in some example embodiments there is a data processing apparatus comprising instruction decoder circuitry to decode instructions and to generate control signals dependent on the instructions; and data processing circuitry to perform data processing operations in response to the control signals, wherein the instruction decoder circuitry is responsive to an atomic sequence number compare-and-swap-max instruction specifying a data item location and a write-attempt value to generate the control signals such that the data processing circuitry seeks to perform a write operation of the write value to the data item location, wherein success of the write operation is contingent on the write-attempt value being greater than a current value at the data item location, wherein values are treated as a wrap-around enumeration of sequence numbers which wraps around from a numerically largest sequence number to a numerically smallest sequence number, and wherein the data processing circuitry is responsive to the control signals to determine that the write-attempt value is greater than the current value when the write-attempt value is ahead of the current value in the wrap-around enumeration by less than half of the numerically largest sequence number.

Similarly, in some example embodiments there is a method of data processing comprising: decoding instructions and generating control signals dependent on the instructions; performing data processing operations in response to the control signals, wherein the decoding instructions comprises, in response to an atomic sequence number compare-and-swap-max instruction specifying a data item location and a write-attempt value: generating the control signals such that the performing data processing seeks to perform a write operation of the write value to the data item location, wherein success of the write operation is contingent on the write-attempt value being greater than a current value at the data item location, wherein values are treated as a wrap-around enumeration of sequence numbers which wraps around from a numerically largest sequence number to a numerically smallest sequence number, and wherein the performing data processing further comprises, in response to the control signals: determining that the write-attempt value is greater than the current value when the write-attempt value is ahead of the current value in the wrap-around enumeration by less than half of the numerically largest sequence number.

The present techniques also envisage that such an atomic sequence number compare-and-swap-max instruction may be part of a simulation or virtual machine environment and accordingly in some example embodiments there is a computer program for controlling a host data processing apparatus to provide an instruction execution environment comprising: instruction decoder logic to decode instructions and to generate control signals dependent on the instructions; and data processing logic to perform data processing operations in response to the control signals, wherein the instruction decoder logic is responsive to an atomic sequence number compare-and-swap-max instruction specifying a data item location and a write-attempt value to generate the control signals such that the data processing logic seeks to perform a write operation of the write value to the data item location, wherein success of the write operation is contingent on the write-attempt value being greater than a current value at the data item location, wherein values are treated as a wrap-around enumeration of sequence numbers which wraps around from a numerically largest sequence number to a numerically smallest sequence number, and wherein the data processing logic is responsive to the control signals to determine that the write-attempt value is greater than the current value when the write-attempt value is ahead of the current value in the wrap-around enumeration by less than half of the numerically largest sequence number.

Some particular embodiments are now described with reference to the figures.

Figure 1:
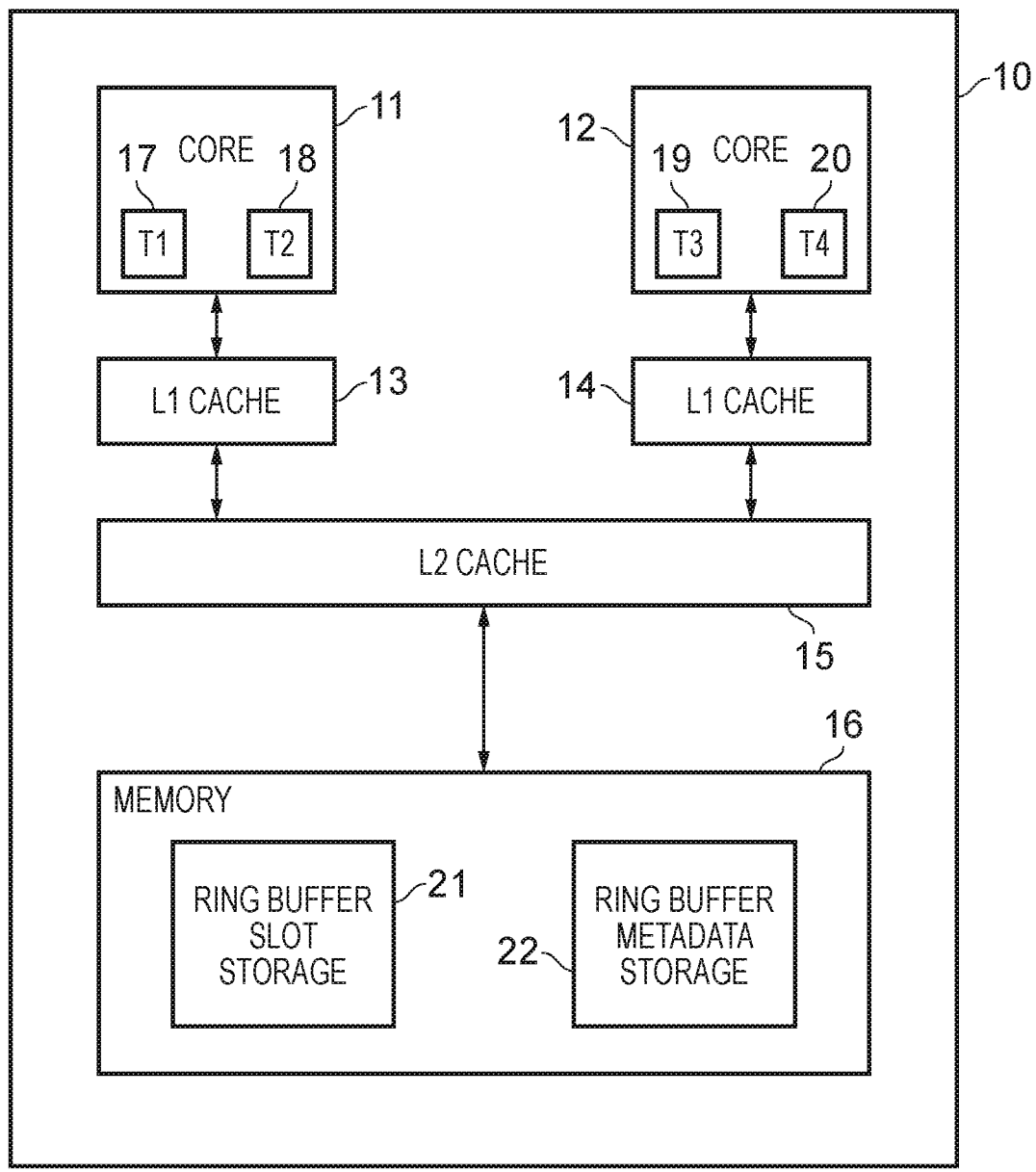

FIG. 1 schematically illustrates a data processing apparatus 10 in some embodiments. The data processing apparatus 10 comprises a first core 11 and a second core 12. Each of these cores are provided with their own private L1 cache namely caches 13 and 14 respectively. A level 2 cache 15 is shared and leads to the memory 16. Not only is the data processing apparatus 10 a multi-core system, it is also a multi-threaded system, this being illustrated in FIG. 1 by the representation of threads T1 17 and T2 18 executing on core 11 and threads T3 19 and T4 20 executing on core 12. In a manner with which one of ordinary skill in the art will be familiar a given thread executing on given processor core performs data processing apparatus on data items retrieved from the memory 16, temporary copies of the data items retrieved from the memory 16 being cached in the cache hierarchy performed by the relevant intervening cache levels. Some data structures of particular relevance to a discussion of the present techniques are schematically illustrated in memory 16 of FIG. 1, namely the ring buffer slot storage 21 and the ring buffer metadata storage 22. The ring buffer slot storage provides storage locations which together form a ring buffer, as will be described in more detail with reference to the figures which follow, and the ring buffer metadata storage 22 provides storage locations for information relating to the ring buffer, such as a head pointer, a tail pointer, and so on. Data structures forming the ring buffer stored at storage locations in the memory 16 are therefore accessed by the threads T1, T2, T3, and T4 executing on the cores 11 and 12. The present techniques will be explained further with reference to these data structures in the figures which follow.

Figure 2:
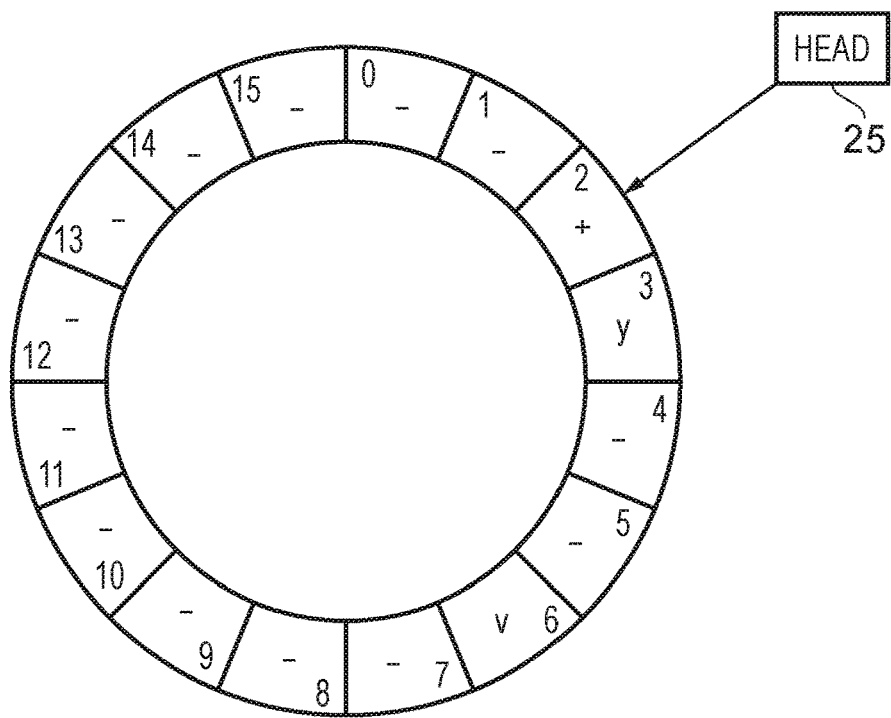

FIG. 2 schematically illustrates a ring buffer comprising 16 slots numbered 0-15. It will be appreciated that a ring buffer will typically comprise a much larger number of slots (although this is not necessary), but the ring buffer of FIG. 2 is limited to 16 slots for simplicity of illustration and discussion only. Some example content of the ring buffer of FIG. 2 is also shown wherein a dash "–" represents a null pointer stored in the corresponding slot and the plus symbol "+" represents an in-order marker. A head pointer 25 is also schematically represented which currently points to slot 2 in which the in-order marker "+" is currently stored. In this example embodiment, the ring buffer of FIG. 2 is a reorder buffer, wherein a strict ordering of the data item indications stored must be respected. The example content of FIG. 2 shows a data item indication stored in slot 3, namely pointer y, and a data item indication stored in slot 6, namely the pointer v. Accordingly, the example content of FIG. 2 shows a situation in which the data item indications y (in slot 3) and v (in slot 6) have been added to the ring buffer (i.e. enqueued) out-of-order, in that the head pointer 25 indicates that slot 2 is the current head of the queue of data items, but further the presence of the in-order marker in slot 2 indicates that this data item is still to be enqueued in the ring buffer. Accordingly, data item y in slot 3 must remain queued in the ring buffer until the required data item for slot 2 has been processed and enqueued. Similarly the data item v in slot 6 must also for the missing data items for slots 4 and 5 to be processed and enqueued, such that all preceding data items between the location of the head pointer 25 (currently slot 2) and the slot preceding slot 6 (i.e. slot 5) have been processed and de-queued, before the data item v in slot 6 can itself be de-queued. The manner in which the present techniques administer this process is described with reference to the figures which follow.

Figure 3:
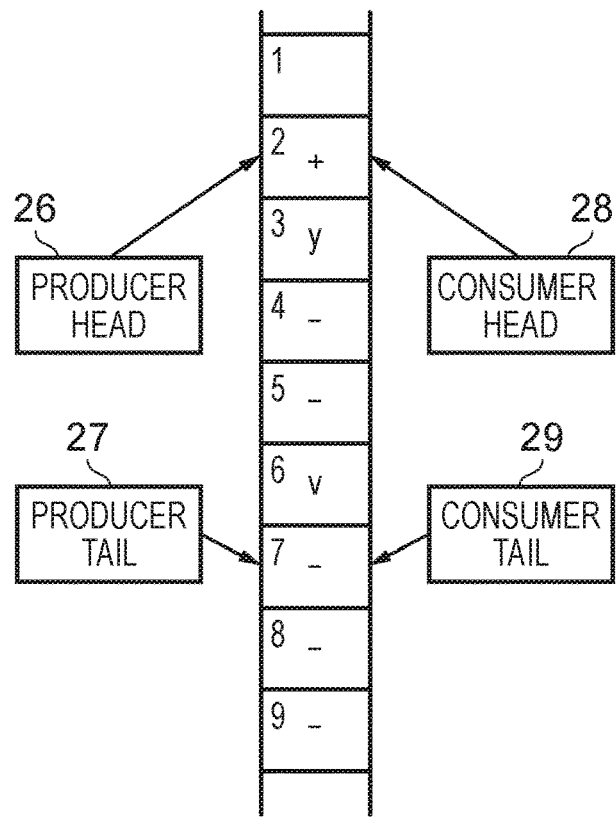

FIG. 3 schematically illustrates a ring buffer arranged to provide a first-in-first-out (FIFO) queue to which multiple producers can add data items and from which multiple consumers can remove processed data items. For simplicity of comparison the slots of the ring buffer based FIFO queue in FIG. 3 are shown having the same content as those of the ring buffer based reorder buffer shown in FIG. 2, however additionally the ring buffer FIFO queue of FIG. 3 is shown to have four associated items of metadata, namely the producer head 26, the producer tail 27, the consumer head 28 and the consumer tail 29. These four items of metadata are pointers which indicate the head and tail of the queued data items to the producers and consumers respectively.

Figure 4:
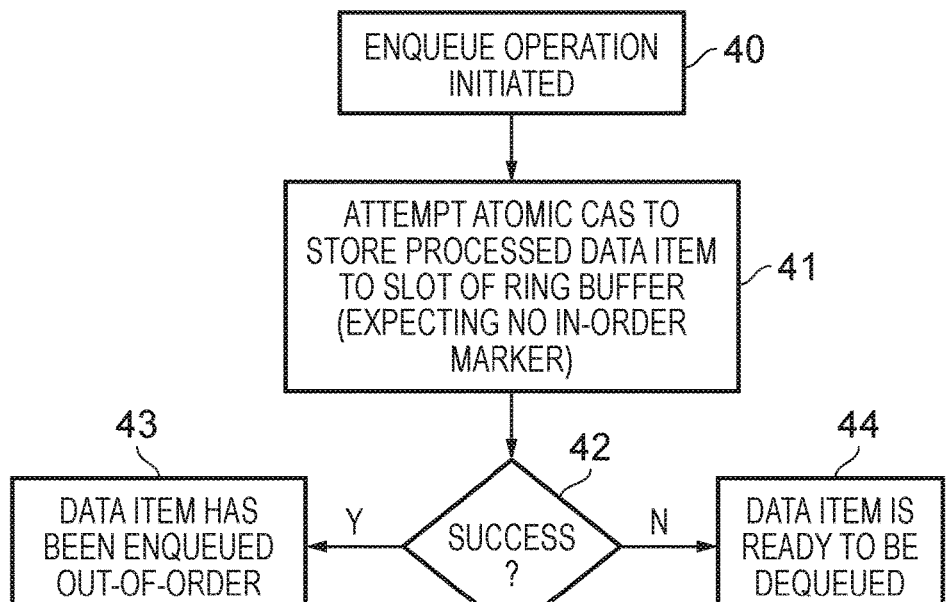

FIG. 4 shows a sequence of steps which are taken to carry out an enqueuing operation according to the method of some embodiments. The enqueuing operation of FIG. 4 begins at step 40. Thereafter at step 41 a processed data item which is the subject of the enqueuing operation is attempted to be stored into a specific slot of the ring buffer using an atomic compare-and-swap operation. This is contingent upon no in-order marker already being present in that slot. The outcome of the attempt is evaluated at step 42 and if successful the flow proceeds to step 43 and the data item has been enqueued out-of-order, i.e. to wait for preceding data items to be enqueued ahead of it. If however at step 42 it is determined that the attempt was unsuccessful, then the flow proceeds to step 44 and the subject processed data item is already ready to be dequeued, since the in-order marker was found in its slot of the ring buffer. This constitutes the determination of a "ready-to-dequeue" condition in the method, which may immediately trigger a dequeuing operation, although this is not essential.

Figure 5:
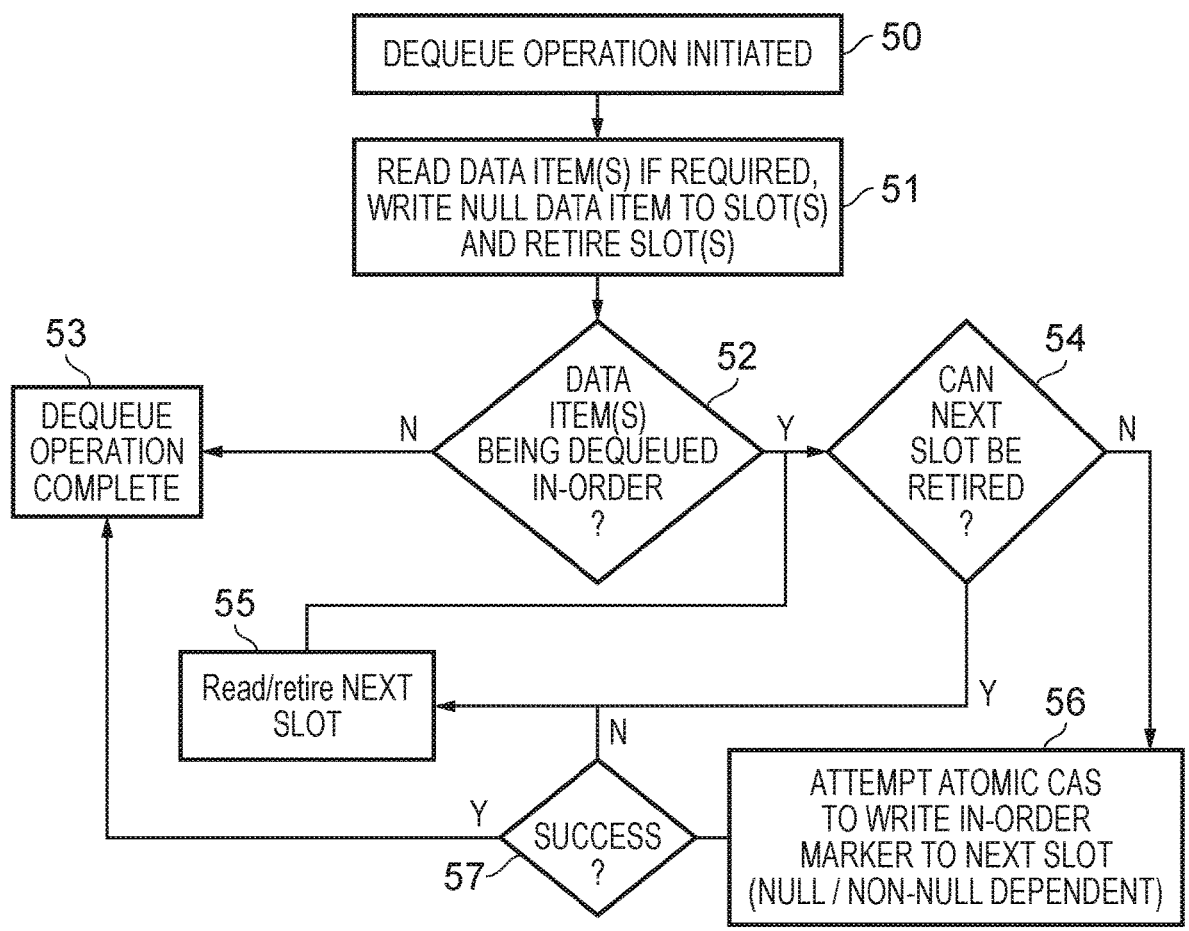

FIG. 5 shows a sequence of steps which are taken to carry out a dequeuing operation according to the method of some embodiments. The dequeuing operation is initiated at step 50 and then at step 51 firstly, if required, one or more data items are read. It is to be noted that in some examples this reading may not be required since, for example, if a single data item has been attempted to be enqueued in a slot of the ring buffer (at step 41 of FIG. 4) and the in-order marker was found to already be present in its slot then (in accordance with step 44 of FIG. 4) this data item can immediately be dequeued and in some embodiments it may not be implemented to write the data item into the slot simply in order to immediately then read it out again. Further, at step 51 the null data item is written to one or more slots (depending on how many slots are the subject of the dequeuing operation) and this slot or those slots are then retired. It is then determined at step 52 if the data item(s) which are the subject of the dequeuing operation are being dequeued in-order. If they are not then the dequeuing operation concludes at step 53. If they are however being dequeued in-order, then it is determined at step 54 if the next slot can be retired. If it can this slot is read/retired at step 55 and the flow comes back to step 54, continuing to retire slots until this is no longer possible. When a next slot is found which cannot be retired then the flow proceeds to step 56 where an atomic compare-and-swap operation to store the in-order marker to this next slot is attempted, the success of which depends on the content of the next slot. It is to be noted that depending on the particular configuration that is discussed in reference to the figures that follow this may depend on null content being present or non-null content being present in the next slot. The success of this attempt is evaluated at step 57 and in the case of success the flow proceeds to step 53 and the dequeuing operation is complete. If however the attempt fails, this means that another process has just made the next slot available for retirement and the flow proceeds to step 55 for this slot to also be retired and any further slots thereafter which can also be retired. Finally, when all slots which can be retired, have been retired and the in-order marker is successfully written to the next slot the dequeue operation completes at step 53.

Figure 6:
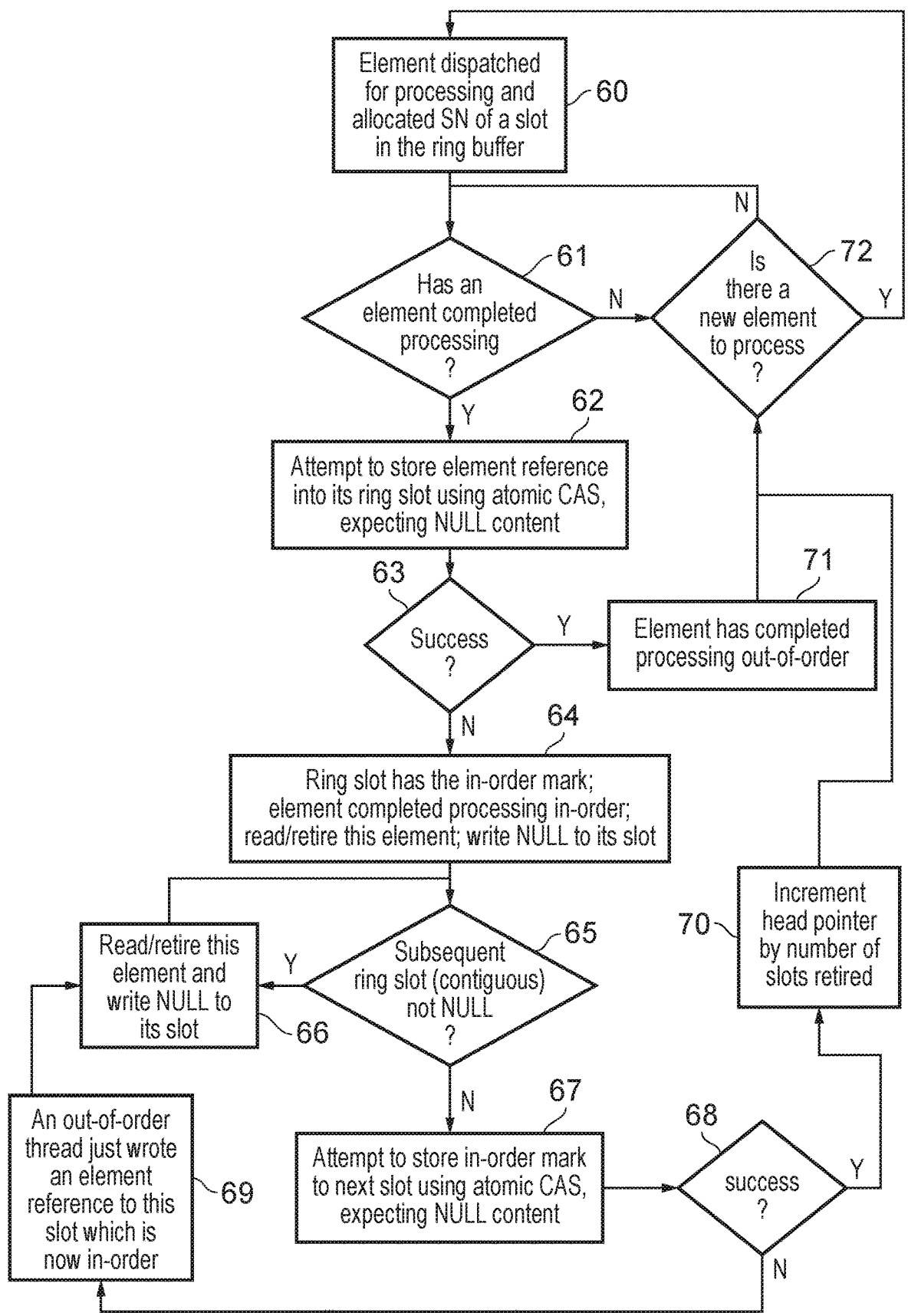

FIG. 6 shows a sequence of steps which are taken according to the method of one embodiment when administering a ring buffer providing a reorder buffer configuration such as that shown in FIG. 2. The flow can be considered to begin at step 60 where an element is dispatched for processing and is allocated a sequence number of a slot in the ring buffer. It is then evaluated at step 61 if an element has completed processing (noting that this processing of elements can be carried out in a multi-threaded environment and multiple elements can concurrently be processed). Whilst this is not the case the flow proceeds to step 72, where it is evaluated if there is a new element ready to be processed and this being the case the flow returns to step 60 for this new element to be allocated its own slot in the ring buffer and for its processing to begin. Once, at step 61, it is determined that an element has completed processing then the flow proceeds to step 62, where an attempt is made to store a reference for the processed element (i.e. a pointer to the storage location of the processed element in memory) into the specified slot in the ring buffer using an atomic compare-and-swap (CAS) operation, contingent on there being null content in that slot. The success of this attempt is evaluated at step 63 and when successful this means that the element has completed processing out-of-order (step 71) and the flow returns back to step 72. If however the attempt was unsuccessful then the flow proceeds to step 64 since this means that the ring slot has the in-order mark and that this element has completed processing in-order, i.e. it can be retired, and the null pointer can be written to its slot making this slot available to a subsequent enqueuing process. The flow proceeds to step 65 where it is also determined if the subsequent (contiguous) ring slot also has non null content and if this is the case then this next element is also retired and the null pointer is written to its slot at step 66, and the steps of 65 and 66 are iterated until all subsequent contiguous elements which are ready and in-order are retired. Once null content is encountered at the next ring slot the flow proceeds to step 67 where an attempt is made to store the in-order mark into this next slot using an atomic CAS operation expecting the null (pointer) content. Success of this attempt is evaluated at step 68 and when successful the in-order mark has been successfully stored into that next slot and the flow proceeds to step 70 for the head pointer of the ring buffer to be incremented by the number of slots retired in the dequeuing process which has just been carried out, and the flow then returns to step 72. If, however, at step 68 it is determined that the attempt to store the in-order mark was unsuccessful this means that another out-of-order process has just written an element into that ring slot, meaning that at least this slot (and possibly further subsequent slots) can now also be retired (step 69)) and the flow joins step 66 for this next element to be retired, the null pointer to be written to its slot, and for the looping steps of step 65 and 66 to continue until all in-order elements are retired. Ultimately the storage of the in-order mark at step 67 succeeds and the dequeuing process is complete.

Figure 7:
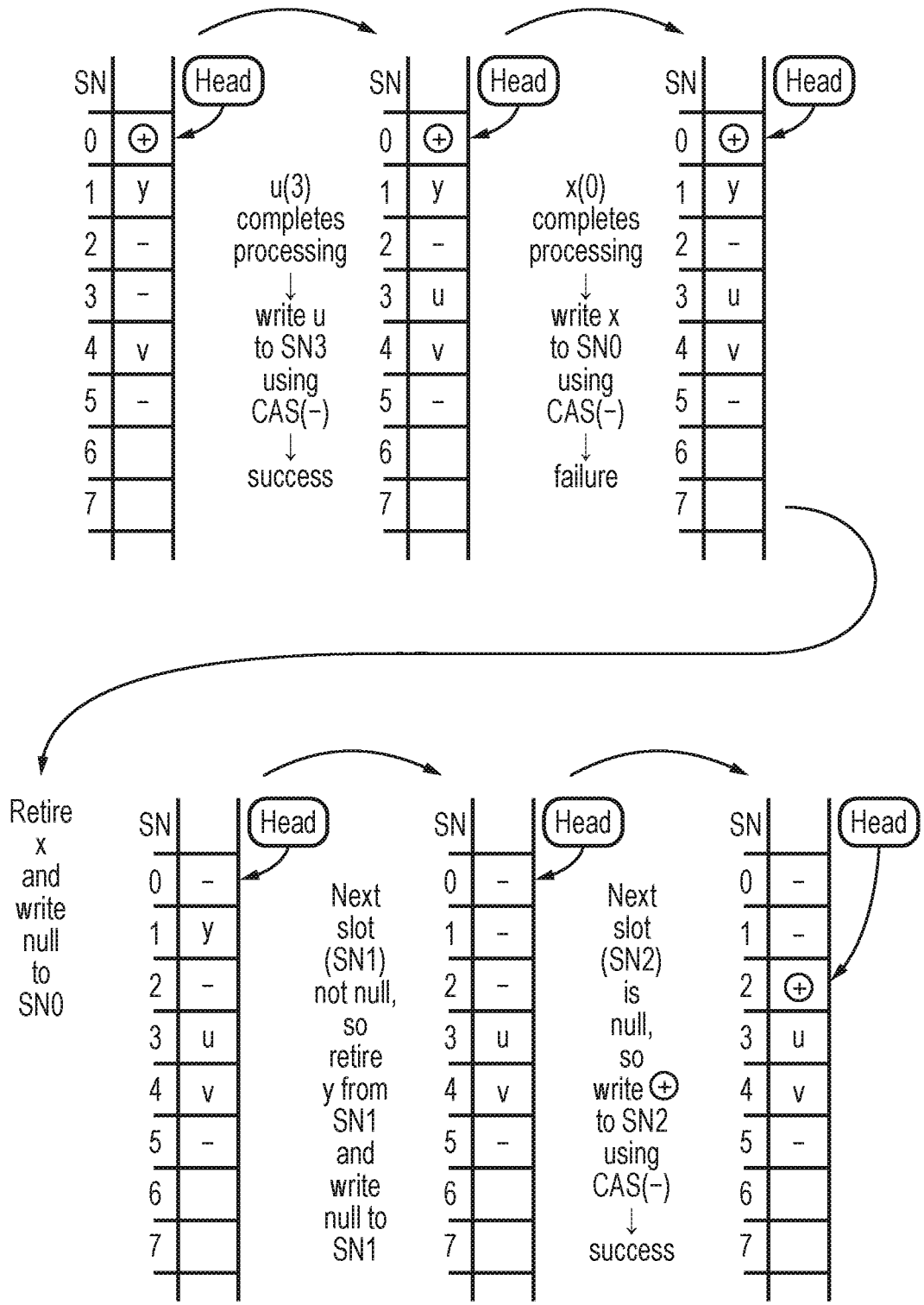

FIG. 7 illustrates the evolution of content of a reorder buffer embodiment of a ring buffer, such as that schematically illustrated in FIG. 2. It is to be noted that the wrap-around "ring" structure of the buffer has been opened out into a linear representation in FIG. 7, but this is merely to facilitate the illustration and it should be understood that the enumerated slots shown in FIG. 7 also wrap around from a maximum numerical value to a minimum numerical value sequence number. Starting in the top left of FIG. 7 the example content of FIG. 2 is the same in this initial position with the in-order marker being stored in sequence number (also slot number) zero to which the head pointer points and with data item indications y and v having been stored out-of-order in slots 1 and 4 respectively. Next, processing of a data item u for which a reference is to be stored in slot 3 completes processing and this data item indication is written to slot number 3 using the atomic CAS operation expecting the null pointer (-) to be the pre-existing content of that slot. This is successful and the data item indication u is successfully written to slot 3. Then processing of data item x completes for which a corresponding pointer is to be written into slot 0. The attempt to write this using the atomic CAS operation (expecting the null pointer) fails, since this item has completed processing in-order and the in-order marker is currently stored in slot 0. Accordingly data item x can be directly retired and the null pointer is written to slot 0. When this is done the next slot (slot number 1) is examined and found to be not null, since a pointer to processed data item y is there and therefore y may also be retired from slot 1. The null pointer is written to this location, however the next slot (2) is found to have the null pointer content indicating that all available in-order data items have been retired and now an attempt is made to write the in-order marker to slot number 2. This is performed using the atomic CAS operation expecting the null pointer to be the pre-existing content, which in the example of FIG. 7 is a success. Finally, the head pointer is updated by the number of items successfully retired (in this example, this being 2).

Figure 8:
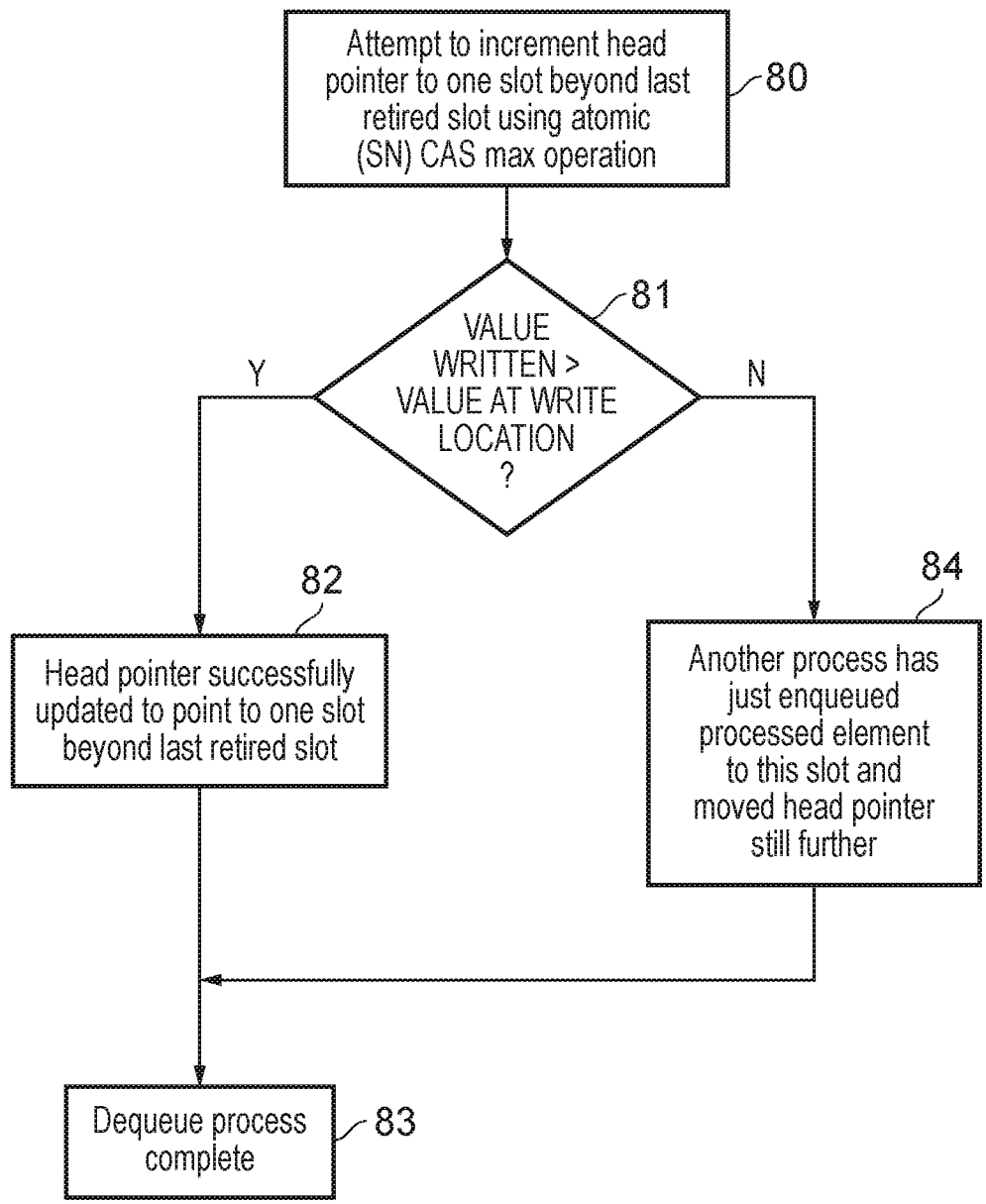
FIG. 8 shows a sequence of steps which are taken in the method of some embodiments when a head pointer is updated during a dequeuing process.

FIG. 8 shows some method steps which correspond to the process of updating the head pointer value, which allow for the fact that concurrent processes may seek to update the head pointer at the same time. For example referring back to FIG. 7 this could be the case where as illustrated an attempt is made to update the head pointer to indicate slot 2, but just before this update is made another concurrent process completes processing of the data item for slot 2 and retires this (together with the subsequent in-order data items u (slot 3) and v (slot 4)) and thus concurrently seeks to update the head pointer to indicate slot 5. In this scenario it is necessary for the update of the head pointer to slot 2 to fail and the update of the head pointer to indicate slot 5 to be successful. Returning to a consideration of FIG. 8, this is provided by the present techniques by the use of an atomic CAS max operation. In order to successfully perform the attempt to update the head pointer to one slot beyond the last retired slot this operation (initiated at step 80) is contingent on the value being written being larger than the value already stored at the target write location. When this condition is found to be true at step 81 then the flow proceeds to step 82 and the head pointer is successfully updated to point to one slot beyond the last retired slot. The dequeuing process then completes at step 83. If however it is evaluated at step 81 that the value attempted to be written is not greater than the value at the write location then the flow proceeds to step 84 since this means that another process has just enqueued the processed data item to this slot (i.e. the slot to which the first head pointer update was attempted at step 80) and has further dequeued this data item and possibly one or more subsequent data items, and moved head pointer still further. The flow then proceeds to step 83 and the dequeuing process completes. In one alternative embodiment, all in-order threads atomically increment the head pointer with the number of elements that each thread has retired. This means that even if these updates happen "in the wrong order", the end result will be correct. However in this example shown the approach is to use an atomic SN CAS max operation (see below) which instead of updating the head pointer incrementally updates it to a new absolute value. For example, assume thread T1 has retired slots up to SN=3 and thread T2 has retired slots up to SN=5. If thread T1 manages to update the head pointer value first then head=3. Then thread T2 updates head=5. However, if thread T2 manages to update the head pointer value first then head=5. Then when thread T1 attempts to update head to 3, 3<5 so the update will fail, and head value remains=5. Essentially therefor thread T2 includes thread T1's update in its own, which is OK because thread T2 has seen thread T1's elements in the ring buffer.

Note that FIG. 8 also indicates the possibility for the attempt to increment the head pointer by the number of slots retired to be performed by an atomic sequence number (SN) CAS max operation. This is a variant on the atomic CAS max operation proposed by the present techniques in which the wraparound enumeration of sequence numbers used for references in the slots of the ring buffer is taken into account when determining whether the value being written is "greater than" the value already at the write location. This is in recognition of the fact that as the use of the sequence numbers approaches and crosses the boundary at which the enumeration wraps around from a maximum sequence number used to a minimum sequence number used it is necessary for a determination of what counts as "greater than" to be carried out taking this into account. Accordingly, the technique proposed is that, with respect to a test value within a given range of sequence numbers, the half of the range values which follow the test value in the wraparound sequence are treated being "larger than" the test value and the half of the range values which precede the test value in the wraparound sequence are treated being "less than" the test value. For example, where 32-bit values are used to enumerate the sequence numbers, the $2^{31}$ values above are deemed to be larger and the $2^{31}$ values below are deemed to be smaller. Where the example of a 32-bit value is mentioned here, it is to be noted that the number of slots administered in a ring buffer is generally far smaller than can be enumerated by this great number of sequence numbers. For example in a contemporary data processing apparatus handling 32-bit values the ring buffer may nevertheless only for example have 1024 slots. In order to facilitate this process the present techniques further propose that a data processing apparatus supporting the implementation of the present techniques may be provided as responsive to a dedicated atomic sequence number compare-and-swap-max operation, i.e. such that in a decoding stage of a pipelined processor this "SN CAS max" instruction is recognized and generates appropriate control signals to cause the execution portion of the data processing pipeline to carry out this variant of an atomic compare-and-swap-max operation, which takes the wraparound nature of sequence numbers into account. Further reference to this type of instruction is made below in reference to FIGS. 16 and 17.

Figure 9:
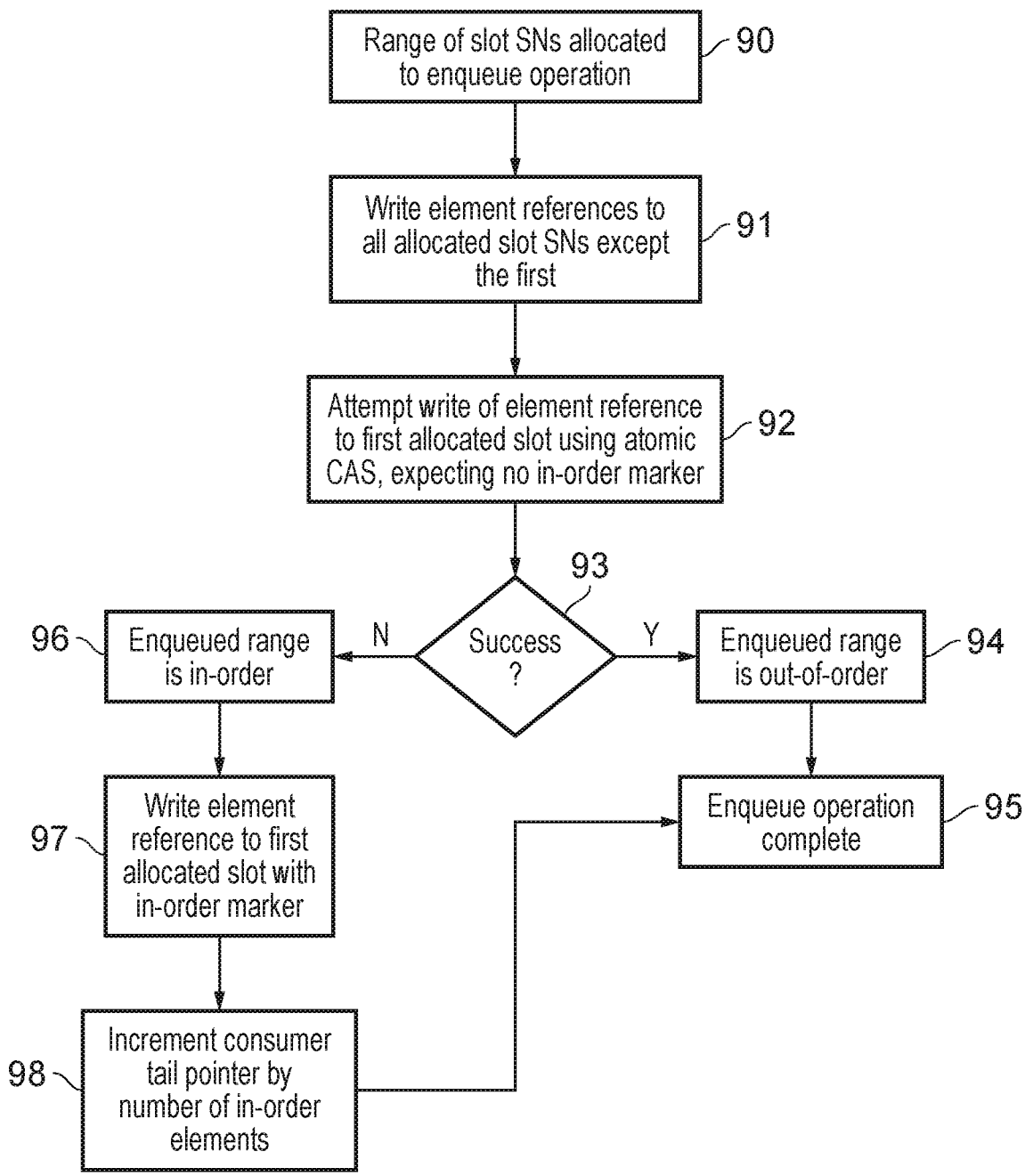
FIG. 9 is a sequence of steps which are taken in the method of some embodiments when an enqueuing operation is carried out.

FIG. 9 shows a flow diagram which illustrates a sequence of steps which are taken in the method of some embodiments when an enqueuing operation is carried out. This type of enqueuing operation corresponds to the administration of a multi-producer, multi-consumer FIFO queue such as that illustrated in FIG. 3. The process begins at step 90 where a range of slot sequence numbers are allocated to an enqueuing operation. This allocation may for example be as is described in co-pending UK patent application GB1902784.6. Then at step 91 the enqueuing operation writes element references (i.e. data item indications) into all allocated slots, except the first. Then at step 92 an attempt is made to write the element reference to the first allocated slot using the atomic CAS write operation contingent on there being no in-order marker stored there. The success of this attempt is evaluated at step 93 and when this is successful the flow proceeds to step 94 where the entire enqueued range for this enqueuing operation is out-of-order and the enqueuing operation concludes at step 95. If, however, it is determined at step 93 that the atomic CAS write was not successful, i.e. that the in-order marker was found in this location, then the range of slots allocated to this enqueue operation is now in-order. From step 96 the flow proceeds to step 97 where the element reference for the first allocated slot is now written (via a normal write operation) to the first allocated slot including the in-order marker. It is to be noted that both the element reference and the in-order marker can be stored into the same allocated slot since the element references in this embodiment (pointers) are memory aligned, here being 16-byte aligned meaning that their four least significant bits are irrelevant to their function (and may for example by default always be zero). At least one of these four least significant bits can therefore be used as the in-order marker and is set to indicate the presence of that marker.

The flow then proceeds to step 98 where the consumer tail pointer is updated by the number of in-order elements added and enqueued. The flow proceeds to step 95 where the enqueuing operation completes.

Figure 10:
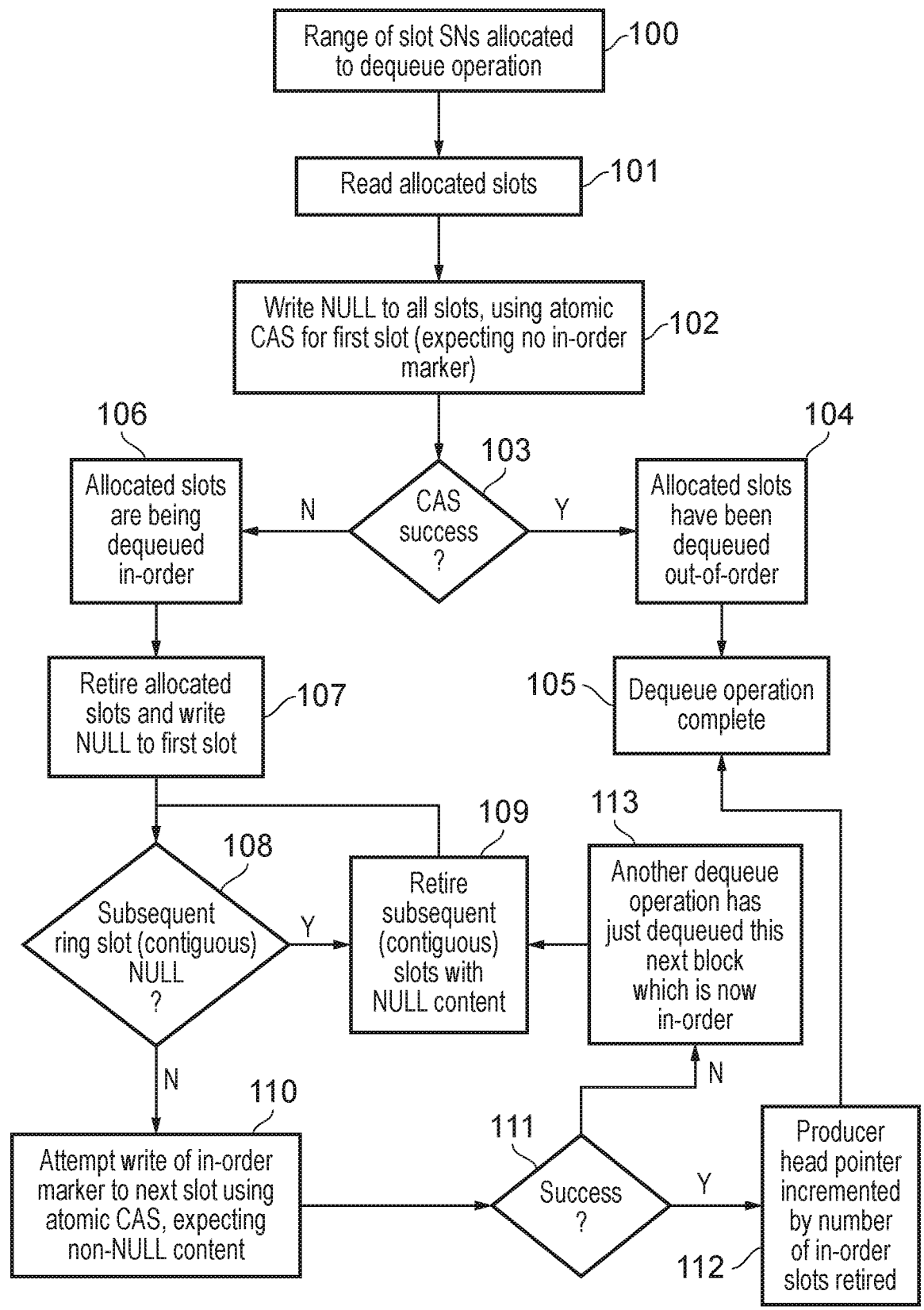
FIG. 10 is a sequence of steps which are taken in the method of some embodiments when a dequeuing operation is carried out.

FIG. 10 shows a sequence of steps taken according to the method of some embodiments in order to carry out a dequeuing operation. This particular type of dequeuing operation is (complementary to the enqueuing operation described with reference to FIG. 9) relevant to a multi-producer, multi-consumer FIFO ring buffer embodiment such as that illustrated in FIG. 3. The flow begins at step 100 where a range of slot sequence numbers are allocated to a dequeuing operation. Again, this allocation may for example be carried out as is described in co-pending UK patent application GB1902784.6. These allocated slots are read at step 101 and at step 102 the null pointer is written to all slots, where as a final step an atomic CAS write is used for the write to the first of these slots contingent upon expecting no in-order marker to be found there. The success of the atomic CAS write operation of step 102 is evaluated at step 103 and when this is successful the flow proceeds to step 104. The allocated slots have been dequeued out-of-order and the flow proceeds from there to step 105 where this dequeuing operation is complete. It is to be noted that since these allocated slots have been dequeued out-of-order the slots cannot however yet be retired in order to be made available to a subsequent enqueuing operation. Returning to a consideration of step 103 when the CAS write operation to the first of the allocated slots is not successful this means that the in-order marker was found in the first slot of the allocated slots, further meaning that (see step 106) these allocated slots are being dequeued in-order. The flow then proceeds to step 107 where these allocated slots are retired (made available to any subsequent enqueuing operations) and a null pointer is written to the first slot. The flow then proceeds to step 108 where it is determined if a subsequent (contiguous) slot in the ring buffer to the slot just retired contains null content (i.e. a null pointer). If it does then these subsequent slots with null content can also be retired (made available to a subsequent enqueuing operation) having been previously dequeued out-of-order. The flow leads back to step 108 and sequential ring slots with null content are retired. Once the determination at step 108 is not true, i.e. a slot with non-null content is found, at step 110 an attempt is made to write the in-order marker to this next slot using the atomic CAS write operation, expecting non-null content. Again it is to be noted that both the non-null content (e.g. a pointer to an enqueued data item) and the in-order marker can be stored in the same location where the pointer to the referenced data item is memory aligned (e.g. 16-byte aligned as described above) and where at least one bit of the unused portion of the least significant bits is used to indicate the in-order marker. The success of the atomic CAS write operation of step 110 is determined at step 111 and when successful the flow proceeds to step 112 for the producer head pointer to be incremented by the number of in-order slots just retired. Note that the variant of FIG. 8 is also applicable to this step in that the update of the producer head pointer may be made via an atomic CAS max operation or indeed an atomic sequence number CAS max operation as described with reference to FIG. 8 in order to allow both for contention between concurrent dequeuing processes and to allow (in the case of the sequence number variant) for the wraparound of the sequence numbers in a ring buffer. As mentioned above, the updating of the head/tail pointers can be done truly incrementally using a standard atomic-add operation (every thread which retires in-order slots must increment with the number of slots it retired) or all in-order threads can attempt an atomic-SN-max operation that will perform an "absolute" update. It is recognized that not all atomic-SN-max operations will then succeed. The flow then concludes at step 105 where the dequeue operation is complete. If however the atomic CAS write of step 110 was evaluated not to have been successful at step 111 then the flow proceeds to step 113 since this indicates that another dequeuing operation has just dequeued this next slot (indeed possibly a next block of slots) which is now in-order. Accordingly the flow returns to step 109 for this/these subsequent slot(s) with null content to also be retired. Eventually the writing of the in-order marker is successful and the dequeuing operation completes at step 105.

FIG. 11 schematically illustrates the evolution of content of an example FIFO ring buffer embodiment when concurrent enqueuing processes are carried out according to the procedure described above with reference to FIG. 9. Accordingly, a first set of slots are allocated to a first thread T1 enqueuing process, a second set of slots are allocated to a second thread T2 enqueuing process, and a third set of slots are allocated to a third thread T3 enqueuing process. Only the content of the first slot of each of these sets of slots is shown, indicating that the first slot of the set of slots allocated to the T1 enqueuing process has the in-order marker whilst the first slot of the second and third sets of slots contain a null pointer. When the sets of slots have been allocated in this fashion in the example shown in FIG. 11 the T2 process proceeds first and in seeking to write its content to these set of slots to enqueue these corresponding data items the atomic CAS write to the first slot (expecting no in-order marker) is successful, since this first slot contains the null pointer. Accordingly on the right of FIG. 11 it can be seen that the slots allocated to the T2 enqueuing process are thus finally enqueued, i.e. ready, but out-of-order.

A similar set of circumstances is shown in FIG. 12 in which the same set of slots are allocated to the same three threads performing enqueuing processes, but in the example of FIG. 12 the T1 enqueuing process is the first to proceed and thus its attempt to write to the first slot of its allocated set of slots using the atomic CAS operation and expecting no in-order marker fails, since the in-order marker is already present in the first slot of those allocated to the T1 enqueuing process. Thus subsequently a regular write is performed of this content clearing the in-order mark (IOMARK). Note that, in embodiments in which distinct enqueuer and dequeuer IOMARKs are used, the relevant IOMARK here is the enqueuer IOMARK and hence any dequeue IOMARK will be preserved). In this case where the CAS write has failed (because the enqueue IOMARK was unexpectedly present), the data item is then written with a regular (unconditional) store. The cleared enqueue IOMARK is written to a later slot (the first empty slot first is found unless the ring buffer is full). It is then known that this set of slots (allocated to the T1 enqueuing process) are now enqueued, i.e. ready, and furthermore in-order, i.e. ready to be dequeued.

FIG. 13 discusses a complementary set of three dequeuing processes, where the content of the same sets of allocated slots are now ready in all slots and the task of dequeuing of these slots is distributed between the three dequeuing threads T1, T2, and T3. In the example of FIG. 13 it is the T2 dequeuing process which is ready first and reads all of its allocated slots and successfully writes a null pointer to all slots as well, with an atomic CAS write operation (expecting no in-order marker) to the first slot of its allocated slot being successful. Thus, on the right hand side of FIG. 13 it can be seen that this set of slots allocated to the T2 process for dequeuing have been successfully dequeued, although the slots cannot yet be retired and made be available to a subsequent enqueuing process, since they are out-of-order.

Turning to FIG. 14, the same initial configuration as shown in FIG. 13 begins on the left hand side of the figure, but in this case it is the T1 dequeuing process that is ready first. It also reads all its slots and successfully writes a null to all but the first allocated slot, since the write of the null pointer to the first allocated slot is attempted using an atomic CAS write operation expecting no in-order marker to be present there. This fails due to the presence of the in-order marker and accordingly the dequeuing process knows that the set of slots allocated to it can not only be dequeued, but also retired (made available to a subsequent enqueuing process) since they are in-order. A regular write is made to store the null pointer in the first slot of the allocated slots to the T1 dequeuing process.

The dequeuing process of FIG. 14 continues in the illustration of FIG. 15, where the set of slots allocated to the T1 dequeuing process has then been retired and, since it was identified that these were in-order, the next slot immediately following the retired slots is then read to determine whether any further subsequent slots can also be retired. In the illustration of FIG. 15 the content of the set of slots which was allocated to the T2 dequeuing process in FIG. 14 is shown with a question mark, since the possibility exists that by the time this stage of the processing of the T1 thread is reached the T2 process may have managed to have dequeued this second set of slots out-of-order. Accordingly, the read of the first slot of the second set of allocated slots determines whether this is the case in that if non-null content is found there (lower right in FIG. 15) then the T2 dequeuing process has not yet dequeued these slots and the T1 dequeuing process only needs to retire its own allocated set of slots. If however null content is found in the first slot of the slots allocated to the T2 dequeuing process then (as is shown in the left hand side of the lower part of FIG. 15) these T2 dequeued set of slots can be retired as well. As before an atomic CAS write of the in-order marker is attempted to the next slot after those slots just retired (in both cases in the lower part of FIG. 15) expecting non-null content. This is successful when this subsequent slot still needs to be dequeued and the dequeuing process ends. If however this atomic CAS write operation fails a yet further set of slots has also just been made available for retirement for out-of-order dequeuing and the process continues.

FIG. 16 schematically illustrates a ring buffer which is subjected to concurrent enqueuing and dequeuing processes in some embodiments. The illustrated content of the ring buffer provides a snapshot of the status of these processes.

A first thread T1 is currently engaged with dequeuing the content of slots 4-6 (these being a contiguous block of slots starting at the "producer head" indicated slot 4). The dequeue in-order mark "D" is also currently stored in slot 4, since this is that start of the in-order sequence of element to be dequeued. A parallel second thread T2 has dequeued slots 7-9 in an out-of-order release. The consumer head pointer thus indicates slot 10 and the consumer tail pointer indicates slot 14 (the slot following the last in-order enqueued slot 13). The enqueue in-order mark "E" is also currently stored in slot 14, since this is the first empty slot of the in-order sequence of slots ready to have elements enqueued in them. In fact, a parallel third thread T3 is currently in the process of enqueuing elements in slots 14-16. Finally, a parallel fourth thread T4 has already enqueued slots 17-18 out-of-order. The producer tail pointer indicates slot 19, the first available slot for enqueuing a new element.

FIG. 17 (represented as FIGS. 17A, 17B, and 17C) is a flow diagram showing a sequence of steps which are taken when administering a ring buffer (such a that shown in FIG. 16) according to the present techniques and in particular when either an enqueuing or dequeuing process is attempted with respect to that ring buffer. It is first to be noted that action 150 shown is disconnected from the flow diagram, since this is an initialization step performed when the ring buffer is first set up, according to which each ring slot of the ring buffer is populated with a readable element (which may for example be NULL content) and also that respective enqueue and dequeue in-order markers (IOMARKs) are initially stored in the ring buffer (typically both being stored in the "first" slot of the ring buffer, i.e. slot 0 in the ring buffer of FIG. 16). Note that a given slot in the ring buffer can thus comprise NULL content or "real" content, as well as either or both of the in-order markers. The illustrated process begins at step 151 when an enqueue or a dequeue is to be attempted. Next at step 152 the process attempts to acquire one or more slots in the ring buffer. Note that this acquisition of process may for example be performed as described in UK patent application 1902784.6). It is then determined at step 153 whether any slots have been acquired. If they have not then the process concludes at step 154 with the process returning 0, indicating that the slot acquisition failed. However, when at least one slot is acquired the flow proceeds to step 155, where (with all acquired slots firstly being read for dequeuer) all but the first ring slot acquired are written to, with the content to be enqueued being written by the enqueue process and NULL elements being written for the dequeue process. Then at step 156 the first slot acquired is written to (with the respective element to be enqueued in the case of enqueue and with the NULL element in case of dequeue). The process clears its own in-order marker and preserves any "opposing" in-order marker. The original value of the slot is returned. The actions of step 156 are performed atomically and may be referred to as an atomic blend operation.

Next (referring to FIG. 17A) it is determined at step 157 if the process' own in-order marker was set in the first slot (using the original value returned). If it was not, then the flow proceeds to step 158. This is an out-of-order release and the flow stops, with the process returning the number of enqueued/dequeued elements (and for dequeue the number of dequeued elements is also returned). If however it is determined at step 157 that the process' own in-order marker was successfully set in the first slot, then the flow proceeds to step 159, since this release has been made in-order and it is then determined if there are any consecutive slots which are ready for release. For enqueue this means that their content is non-null, whereas for dequeue this means their content is null. The opposite in order marker must also not be set in the slot under consideration. The first not-ready slot value is then returned. Next at step 160 the process attempts to set its own in-order marker in the not-ready slot. Both the content of the opposite in-order marker are preserved (this being performed using an atomic compare-and-swap operation, using the not-ready slot value). The flow then proceeds to step 161, where it is determined if the not-ready slot value was unchanged and the compare-and-swap operation succeeded. If it did not then the flow returns to step 159, because this not-ready slot has just become ready for release. If however at step 161 it is determined that the compare-and-swap succeeded, the flow proceeds to step 162 (see FIG. 17C). Step 162 shows that "the buck was successfully passed", i.e. that the process has successfully moved the relevant in-order marker on, such that it can be picked up by the next process of the same type (i.e. dequeue or enqueue). Next at step 163 the tail pointer (for enqueue) or the head pointer (for dequeue) is updated to indicate the index of the not-ready slot, unless the tail/head is not already greater, this being performed by the abovementioned atomic SN max operation. Finally, at step 164 the in-order release concludes and returns the number of enqueued or dequeued elements (where the dequeued process also returns the dequeued elements).

FIG. 18 schematically illustrates an apparatus 200 which may embody various examples of the present techniques. The apparatus 200 illustrated in FIG. 18 comprises data processing circuitry 212 which performs data processing operations on data items in response to a sequence of instructions. These instructions are retrieved from a memory 214 and, in a manner with which one of ordinary skill in the art will be familiar, fetch circuitry 216 is provided to support this. The instructions caused to be retrieved from the memory 214 by the fetch circuitry 216 are passed to the instruction decoding circuitry 220, which generates control signals which are arranged to control various aspects of the configuration and operation of the processing circuitry 212, as well as of a set of registers 222 and a load/store unit 224. It will be appreciated that the illustration of FIG. 18, for the purposes of providing a brief coherent overview, is only provided at a high level of abstraction, and many detailed aspects of the configuration of such a data processing apparatus (with which one of ordinary skill in the art will be familiar) are omitted merely for clarity of illustration and discussion. Data values required by the data processing circuitry 212 (as defined in the instructions which it executes) are retrieved from the memory 214, may be cached in a data cache (not explicitly shown and which may in fact comprise a hierarchy of cache levels) and are stored in the registers 222, in order to allow particular data operations on those data values to be carried out by the processing circuitry 212. Thus modified, a data item held in a register 222 may be caused to be stored back to memory. The retrieval of data items from the memory 214 and the storing of data items back to the memory 214 is administered by the load/store circuitry 224. Note also that four threads 228, 229, 230, and 231 are conceptually shown within the processing circuitry 212, illustrating the fact that this processing circuitry is multi-threaded, i.e. meaning that it can concurrently execute multiple data processing threads (i.e. sequences of instructions). The decoding circuitry 220 of this illustrated example is also specifically provided such that it recognizes and is responsive to the above-mentioned atomic sequence number compare-and-swap-max instruction and when such an instruction (proposed herein) is encountered the control signals generated cause the processing circuitry to perform the atomic sequence number compare-and-swap-max operation as described above.

FIG. 19 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 which is the same as the application program interface of the hardware architecture being modelled by the simulator program 310. Thus, the program instructions of the target code 300, including operations to perform the enqueuing and dequeuing of elements of a ring buffer as described above, (and further in some embodiments including the proposed novel atomic sequence number compare-and-swap-max instruction), may be executed from within the instruction execution environment using the simulator program 310, so that a host computer 730 which does not actually have the hardware features of the apparatus 10 discussed above can emulate these features.

In brief overall summary, data processing apparatuses, methods of data processing, complementary instructions and programs related to ring buffer administration are disclosed. An enqueuing operation performs an atomic compare-and-swap operation to store a first processed data item indication to an enqueuing-target slot in the ring buffer contingent on an in-order marker not being present there and, when successful, determines that a ready-to-dequeue condition is true for the first processed data item indication. A dequeuing operation, when the ready-to-dequeue condition for a dequeuing-target slot is true, comprises writing a null data item to the dequeuing-target slot and, when dequeuing in-order, further comprises, dependent on whether a next contiguous slot has null content, determining a retirement condition and, when the retirement condition is true, performing a retirement process on the next contiguous slot comprising making the next contiguous slot available to a subsequent enqueuing operation. Further subsequent slots may also be retired. An atomic compare-and-swap operation finally stores the in-order marker to a reached slot contingent on content of the reached slot. An atomic sequence number compare-and-swap instruction is also proposed to support these operations.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A data processing apparatus comprising:
 ring buffer storage circuitry to store components of a ring buffer comprising multiple slots to hold queued data items; and
 data processing circuitry to perform an enqueuing operation to add one or more processed data item indications to the ring buffer and to perform a dequeuing operation to remove one or more processed data item indications from the ring buffer,
 wherein the enqueuing operation comprises performing an atomic compare-and-swap operation to store a first processed data item indication to an enqueuing-target slot in the ring buffer contingent on an in-order marker not being present in the enqueuing-target slot and, when the in-order marker is present in the enqueuing-target slot, determining a ready-to-dequeue condition to be true for the first processed data item indication, and
 wherein the dequeuing operation comprises, when the ready-to-dequeue condition for a dequeuing-target slot is true:
 writing a null data item to the dequeuing-target slot; and
 when removing the one or more processed data item indications from the ring buffer in-order, the dequeuing operation further comprises:

a) dependent on whether a next contiguous slot has null content, determining a retirement condition and, when the retirement condition is true, performing a retirement process on the next contiguous slot comprising making the next contiguous slot available to a subsequent enqueuing operation;
 b) repeating step a) through subsequent slots until for a reached slot the retirement condition is not true;
 c) performing an atomic compare-and-swap operation to store the in-order marker to the reached slot contingent on content of the reached slot; and
 d) when the atomic compare-and-swap operation to store the in-order marker to the reached slot fails, performing the retirement process on the reached slot and returning to step a), wherein the next contiguous slot is now treated as a slot which contiguously follows the reached slot.

2. The data processing apparatus as claimed in claim 1, wherein the ring buffer is arranged as a reorder buffer, wherein the data processing circuitry is arranged to perform the enqueuing operation to add the one or more processed data item indications to the ring buffer when the processing of the data items is complete, and not to perform the dequeuing operation to remove the one or more processed data item indications from the ring buffer unless the one or more processed data item indications are in-order.

3. The data processing apparatus as claimed in claim 1, wherein the data processing circuitry is responsive to the ready-to-dequeue condition being true for the first processed data item indication to commence the dequeuing operation with the dequeuing-target slot being where the first processed data item indication is to be found.

4. The data processing apparatus as claimed in claim 2, wherein in the dequeuing operation the retirement condition is determined to be true when the next contiguous slot does not have null content,
 and wherein making the next contiguous slot available to the subsequent enqueuing operation comprises retiring the next contiguous slot and writing null content to the next contiguous slot.

5. The data processing apparatus as claimed in claim 2, wherein in the dequeuing operation the performing the atomic compare-and-swap operation to store the in-order marker to the reached slot is contingent on the reached slot having null content.

6. The data processing apparatus as claimed in claim 1, wherein the ring buffer is arranged as a FIFO queue, and wherein the data processing circuitry is arranged to support multiple concurrent enqueuing processes to perform enqueuing operations and to support multiple concurrent dequeuing processes to perform dequeuing operations.

7. The data processing apparatus as claimed in claim 6, wherein the data processing circuitry is arranged to allocate a unique set of enqueuing slots to each of the multiple concurrent enqueuing processes and to allocate a unique set of dequeuing slots to each of the multiple concurrent dequeuing processes.

8. The data processing apparatus as claimed in claim 7, wherein the enqueuing-target slot is a first slot of the unique set of enqueuing slots and the enqueuing operation comprises writing processed data item indications to the unique set of enqueuing slots other than enqueuing-target slot before performing the atomic compare-and-swap operation to store the first processed data item indication to the enqueuing-target slot.

9. The data processing apparatus as claimed in claim 8, wherein, when the in-order marker is present in the enqueuing-target slot and the ready-to-dequeue condition is true for the first processed data item indication, the enqueuing operation further comprises a further step of writing the first processed data item indication to the enqueuing-target slot.

10. The data processing apparatus as claimed in claim 7, wherein the dequeuing process further comprises:
    reading the content of the unique set of dequeuing slots;
    writing the null data item to the unique set of dequeuing slots other than the dequeuing-target slot; and
    performing an atomic compare-and-swap operation to store the null data item to the dequeuing-target slot in the ring buffer contingent on an in-order marker not being present in the dequeuing-target slot and,
    when the in-order marker is present in the dequeuing-target slot, determining that the content of the unique set of dequeuing slots is being removed from the ring buffer in-order, and
    when the in-order marker is not present in the dequeuing-target slot, determining that the content of the unique set of dequeuing slots is being removed from the ring buffer out-of-order and concluding the dequeuing process.

11. The data processing apparatus as claimed in claim 10, wherein, when removing the content of the unique set of dequeuing slots in-order, in the dequeuing operation the retirement condition is determined to be true when the next contiguous slot has null content,
    and wherein making the next contiguous slot available to the subsequent enqueuing operation comprising retiring a set of next contiguous slots which have null content.

12. The data processing apparatus as claimed in claim 7, wherein in the dequeuing operation the performing the atomic compare-and-swap operation to store the in-order marker to the reached slot is contingent on the reached slot not having data null content.

13. The data processing apparatus as claimed in claim 1, wherein the data processing circuitry is arranged to perform an initialisation operation to store the in-order marker to a defined first slot of the ring buffer and to store null data content to all of the multiple slots of the ring buffer.

14. The data processing apparatus as claimed in claim 1, wherein the in-order marker comprises an enqueue in-order marker and a dequeue in-order marker.

15. The data processing apparatus as claimed in claim 1, wherein the null data content is a null pointer.

16. The data processing apparatus as claimed in claim 1, wherein the processed data item indications are memory aligned such that at least one lower order bit of the processed data item indications is functionally irrelevant to the processed data item indications, and the in-order marker is represented by the at least one lower order bit.

17. The data processing apparatus as claimed in claim 1, further comprising a cache associated with the data processing circuitry, wherein the data processing circuitry is arranged to perform a swizzle operation on a set of lower order bits of sequence numbers used to enumerate the multiple slots of the ring buffer to generate the memory addresses of the multiple slots, wherein a size of the set of lower order bits is selected in dependence on a cache line size of the cache.

18. The data processing apparatus as claimed in claim 1, wherein the dequeuing operation further comprises, when the atomic compare-and-swap operation to store the in-order marker to the reached slot succeeds, incrementing a head pointer indicative of a current head slot of the multiple slots of the ring buffer by a total number of slots retired in the dequeuing operation.

19. The data processing apparatus as claimed in claim 18, wherein incrementing the head pointer is an atomic compare-and-swap-max operation, wherein success of the atomic compare-and-swap-max operation is contingent on a write-attempt value of the head pointer being greater than a current value of the head pointer.

20. The data processing apparatus as claimed in claim 18, wherein incrementing the head pointer is an atomic sequence number compare-and-swap-max operation, wherein success of the atomic sequence number compare-and-swap-max operation is contingent on a write-attempt value of the head pointer being greater than a current value of the head pointer wherein a wrap-around enumeration of the multiple slots of the ring buffer wraps around from a numerically largest sequence number to a numerically smallest sequence number, and wherein the atomic sequence number compare-and-swap-max operation is arranged to determine that the write-attempt value is greater than the current value when the write-attempt value is ahead of the current value in the wrap-around enumeration by less than half of the numerically largest sequence number.

21. A method of data processing comprising:
    storing components of a ring buffer comprising multiple slots to hold queued data items;
    performing an enqueuing operation to add one or more processed data item indications to the ring buffer;
    performing a dequeuing operation to remove one or more processed data item indications from the ring buffer,
    wherein the enqueuing operation comprises performing an atomic compare-and-swap operation to store a first processed data item indication to an enqueuing-target slot in the ring buffer contingent on an in-order marker not being present in the enqueuing-target slot and, when the in-order marker is present in the enqueuing-target slot, determining a ready-to-dequeue condition to be true for the first processed data item indication, and
    wherein the dequeuing operation compnses, when the ready-to-dequeue condition for a dequeuing-target slot is true:
    writing a null data item to the dequeuing-target slot; and
    when removing the one or more processed data item indications from the ring buffer in-order, the dequeuing operation further comprises:
    a) dependent on whether a next contiguous slot has null content, determining a retirement condition and, when the retirement condition is true, performing a retirement process on the next contiguous slot comprising making the next contiguous slot available to a subsequent enqueuing operation;
    b) repeating step a) through subsequent slots until for a reached slot the retirement condition is not true;
    c) performing an atomic compare-and-swap operation to store the in-order marker to the reached slot contingent on content of the reached slot; and
    d) when the atomic compare-and-swap operation to store the in-order marker to the reached slot fails, performing the retirement process on the reached slot and returning to step a), wherein the next contiguous slot is now treated as a slot which contiguously follows the reached slot.

* * * * *